United States Patent
Arai et al.

(10) Patent No.: US 6,873,081 B2
(45) Date of Patent: Mar. 29, 2005

(54) BRUSHLESS DC MOTOR AND REFRIGERANT COMPRESSOR EMPLOYING THE MOTOR

(75) Inventors: Kazuhiko Arai, Gunma (JP); Keijiro Igarashi, Gunma (JP); Masaaki Takezawa, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/145,173

(22) Filed: May 13, 2002

(65) Prior Publication Data

US 2002/0130580 A1 Sep. 19, 2002

Related U.S. Application Data

(62) Division of application No. 09/605,297, filed on Jun. 28, 2000, now Pat. No. 6,414,413.

(30) Foreign Application Priority Data

Jun. 29, 1999 (JP) .......................................... 11-184130

(51) Int. Cl.$^7$ ................................................ H02K 3/34
(52) U.S. Cl. ...................................... 310/215; 310/254
(58) Field of Search .................................. 310/215, 254

(56) References Cited

U.S. PATENT DOCUMENTS

| | | | |
|---|---|---|---|
| 3,735,169 A | 5/1973 | Balke et al. | 310/214 |
| 3,745,394 A | 7/1973 | Mason | 310/215 |
| 3,940,647 A | 2/1976 | Keuper et al. | 310/214 |
| 3,956,651 A * | 5/1976 | Brammerlo | 310/218 |
| 3,959,678 A * | 5/1976 | Donahoo | 310/172 |
| 4,151,436 A * | 4/1979 | Smith | 310/215 |
| 4,263,475 A * | 4/1981 | McNeal | 174/138 E |
| 4,488,075 A * | 12/1984 | DeCesare | 310/156.22 |
| 4,563,606 A * | 1/1986 | Fukasawa et al. | 310/208 |
| 4,685,201 A | 8/1987 | Boyd, Jr. | |
| 5,304,883 A * | 4/1994 | Denk | 310/180 |
| 5,306,976 A | 4/1994 | Beckman | 310/215 |
| 5,331,240 A * | 7/1994 | Hyodo | 310/71 |
| 5,369,325 A | 11/1994 | Nagate et al. | 310/156 |
| 5,508,576 A | 4/1996 | Nagate et al. | 310/156 |
| 5,528,822 A * | 6/1996 | Ponzio et al. | 29/736 |
| 6,189,335 B1 | 2/2001 | Ebara et al. | 62/510 |

FOREIGN PATENT DOCUMENTS

| | | |
|---|---|---|
| DE | 749 989 C | 5/1944 |
| EP | 0 772 275 A | 5/1997 |
| JP | 06 237545 A | 8/1994 |
| JP | 08 019202 A | 1/1996 |

OTHER PUBLICATIONS

Patent Abstracts of Japan, vol. 018, No. 623 (E–1635), Nov. 28, 1994.
Patent Abstracts of Japan, vol. 1996, No. 05, May 31, 1996.

* cited by examiner

*Primary Examiner*—Joseph Waks
(74) *Attorney, Agent, or Firm*—Darby & Darby

(57) ABSTRACT

A concentrated winding type brushless DC motor has a stator formed by a slack of laminations of a ferro-magnetic material having an outer ring from which a plurality of spaced teeth extend inwardly and have slots between adjacent teeth. A drive coil is wound around each tooth in the presence of a spacer provided between an end surface of a stator tooth and the drive coil to reduce stress applied to a tooth by the coil as it is being wound. The final form of the motor has the spacer removed leaving a space between the coil and the tooth to form a magnetic pole of the stator.

4 Claims, 41 Drawing Sheets

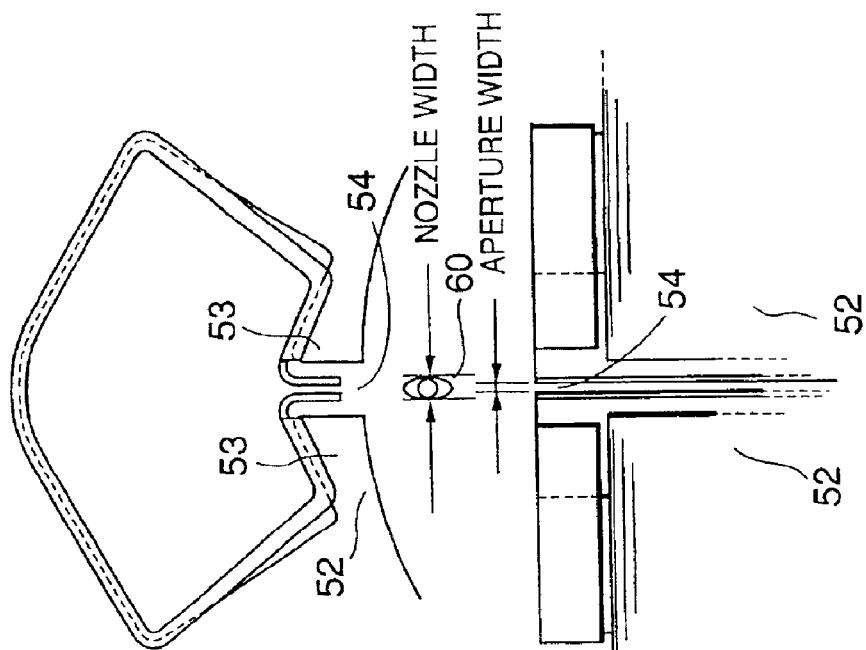
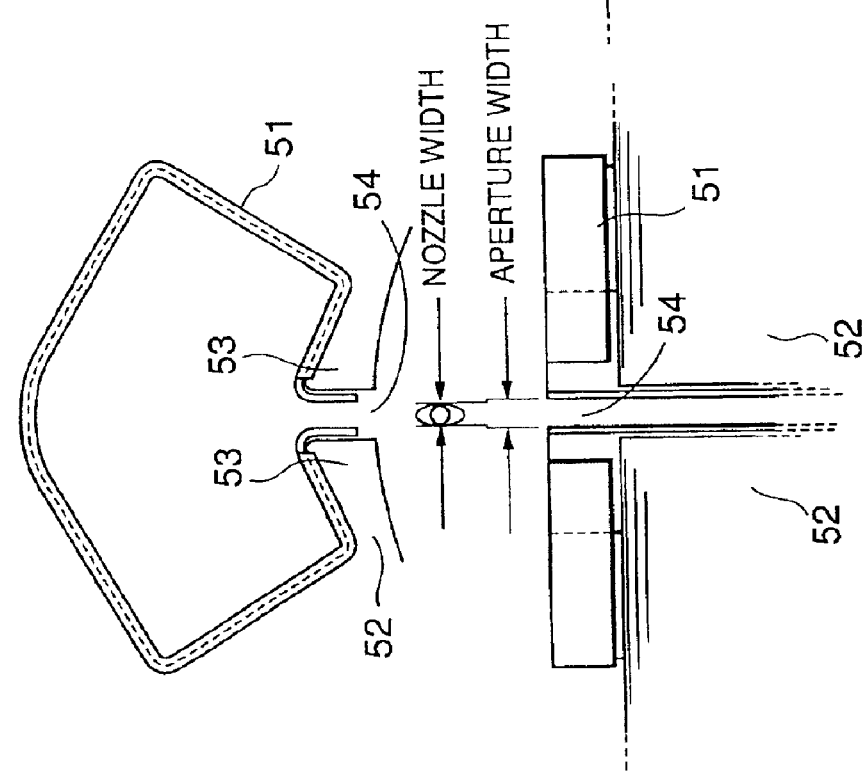

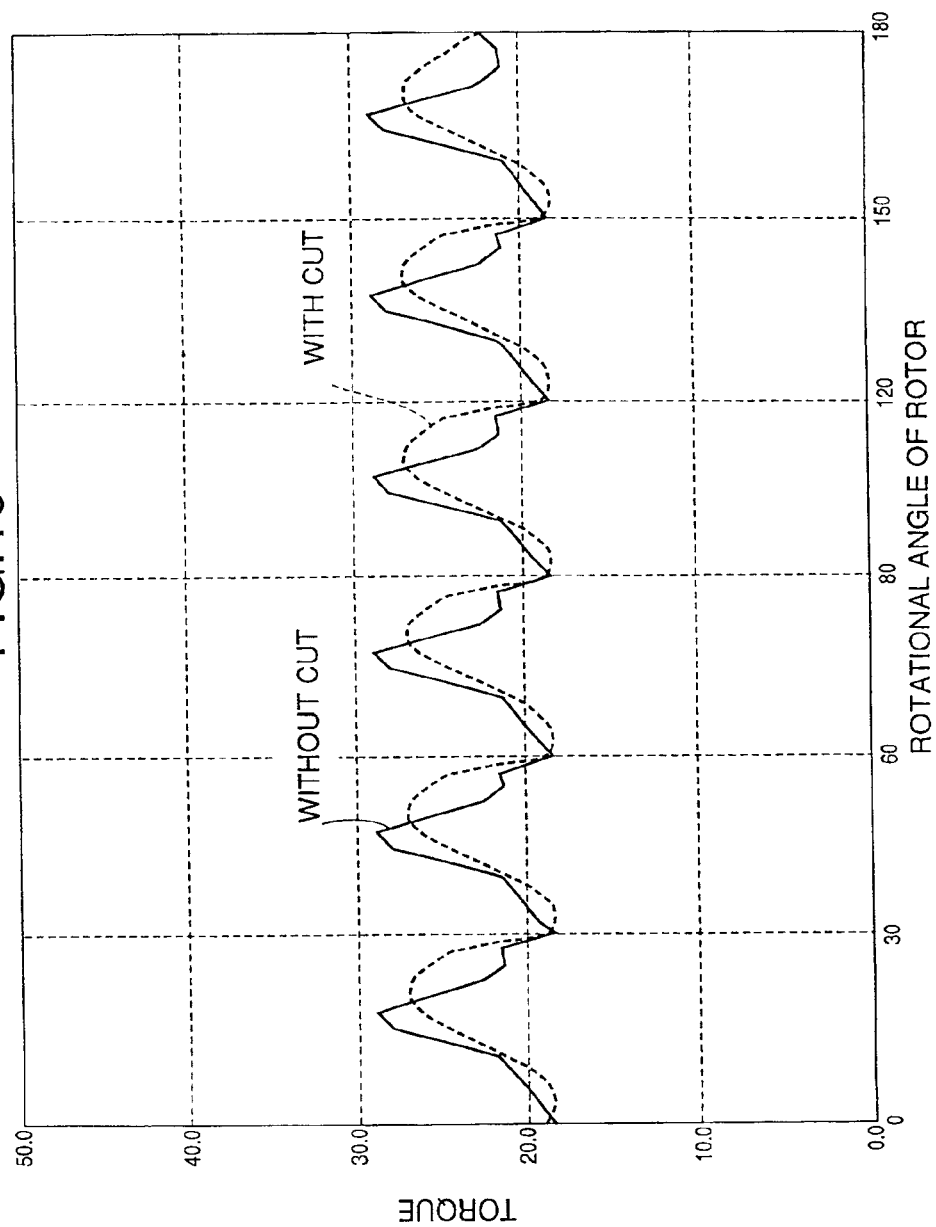

OUTGOING LINE JIG
FIG.20A   FIG.20B
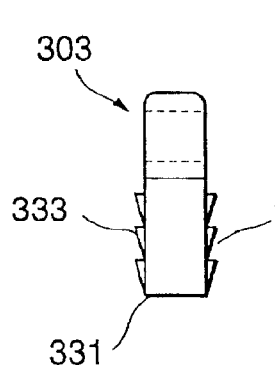
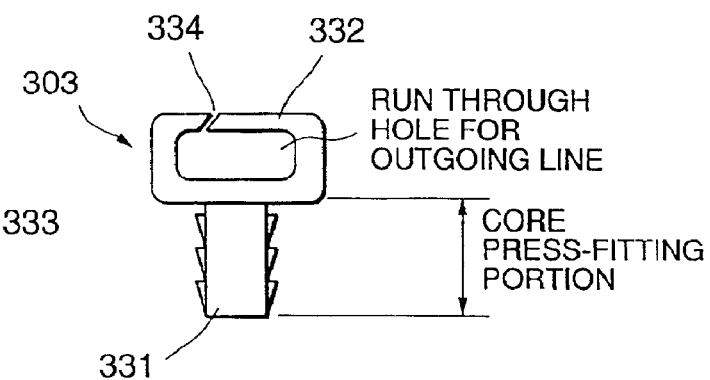
FIG.20C
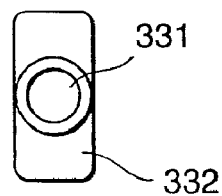

1004 SLOT INSULATING PAPER

<br>

BRUSHLESS DC MOTOR AND REFRIGERANT COMPRESSOR EMPLOYING THE MOTOR

This application is a division of Ser. No. 09/605,297 filed Jun. 28, 2000, now U.S. Pat. No. 6,414,413.

BACKGROUND OF THE INVENTION

1. Field of the Invention

The present invention relates to a brushless DC motor employed with a refrigerant compressor or the like.

2. Description of Related Art

There is a prior art regarding a brushless DC motor that has been disclosed in Japanese Unexamined Patent Publication No. 8-237897.

As the same type of the brushless DC motor disclosed in the publication, there is one shown in FIG. 6 that includes a sheet-like insulating constituent 51, an iron core 52, teeth 53 of the iron core, and a slot aperture 54 between teeth. The insulating constituent, which is formed by folding beforehand, is disposed at the slot or the slot aperture 54, then a winding is provided on the insulating constituent to assemble the brushless DC motor.

If the winding is, for example, automatically wound by a machine around the iron core of the brushless DC motor as described above, insufficiently folded ends 55 of the insulating constituent 51 are positioned at a center of the slot aperture 54 causes a nozzle 60 for wrapping the winding to push the ends of the insulating constituent. This has been posing a danger of the insulating constituent to be dislocated or broken (refer to FIG. 6B). The dislocated or broken insulating constituent has been leading to a likelihood of an insulation failure.

SUMMARY OF THE INVENTION

Accordingly, it is an object of the present invention to provide a brushless DC motor capable of improving productivity and minimizing chances of insulation failures.

To this end, according to one aspect of the present invention, there is provided a brushless DC motor having a winding directly provided on a tooth of a stator, comprising; a plate-like insulating constituent disposed at the tooth; and a slant portion provided on an end portion of the insulating constituent positioned between teeth such that the slant portion is inclined with respect to a central line between the teeth.

The insulating constituent is formed to be symmetrical with respect to the central line between the teeth.

A coil end or the coil end and an outgoing line are bound using a polyester thread.

A permanent magnet provided in a rotor of the brushless DC motor employs a rare earth material.

In a distal end portion of a tooth of a stator core of a concentrated winding type motor, a cut portion is formed on an inner-diameter tooth portion excluding a tooth body so that the cut portion extends as far as an aperture.

In the distal end portion of a tooth of the stator core of the concentrated winding type motor, the cut portion is provided on one side of the inner-diameter tooth portion excluding the tooth body so that the cut portion extends as far as the aperture.

In the distal end portion of a tooth of the stator core of the concentrated winding type motor, cut portions are provided on both sides of the inner-diameter tooth portion excluding the tooth body so that the cut portions extend as far as the aperture.

In the distal end portion of a tooth of the stator core of the concentrated winding type motor, a hole is provided in the vicinity of a slot aperture in a distal end portion excluding the tooth body.

In the distal end portion of a tooth of the stator core of the concentrated winding type motor, a groove is provided in the vicinity of a slot aperture in the distal end portion excluding the tooth body.

In the distal end portion of a tooth of the stator core of the concentrated winding type motor, a notch is provided so as to substantially increase a width of a gap between opposing tooth distal end portions.

The stator core of the concentrated winding type motor has a jig inserting hole for processing an outgoing line that is opened in an axial direction of the motor on an outer periphery side at a center of a stator tooth so that a relationship represented by $H \geq T/2$ is established when a distance between a tooth and a corner at a slot bottom is denoted by H and a mean tooth width is denoted by T. An outgoing line of a drive coil is secured to a junction insert that is fixedly inserted in the jig inserting hole.

The stator core of the concentrated winding type motor has a jig inserting hole for processing an outgoing line that has been opened in an axial direction of the motor on an outer periphery side at a center of a stator tooth so that a relationship represented by $H \geq T/2$ is established when a distance between a tooth and a corner at a slot bottom is denoted by H and a mean tooth width is denoted by T. An outgoing line of a drive coil is secured to a junction insert that is fixedly inserted in the jig inserting hole. The jig inserting holes and the junction inserts are provided on an arbitrary number of stator teeth.

The stator core of the concentrated winding type motor has: a jig inserting hole for processing an outgoing line that has been opened in an axial direction of the motor on an outer periphery side at a center of a stator tooth so that a relationship represented by $H \geq T/2$ is established when a distance between a tooth and a corner at a slot bottom is denoted by H and a mean tooth width is denoted by T; and a resinous insulating jig fixedly inserted in the jig inserting hole. An inserting shaft of the junction insert has a device for preventing slippage in one direction, and an outgoing line of the drive coil is secured to a junction insert composed of an annular means for securing the outgoing line that has a cut in a part of its top portion.

A tooth distal end of the stator core of the concentrated winding type motor is constructed such that a distance T between a line A connecting right and left distal end points A and A' of a tooth distal end portion of the stator core and a tangent B of an inner diameter of tooth is $T \geq 0$ (closer to an outer diameter of the stator).

In the stator of the concentrated winding type motor, a lead connection and a neutral point of the drive coil are buried in a slot by making use of a space of the slot of the stator core.

In the stator of the concentrated winding type motor, the lead connection and a neutral point of the drive coil is buried in the slot by making use of a space secured in the slot of the stator core for operating a needle of a winding nozzle when winding the drive coil.

In the stator of the concentrated winding type motor, the drive coil is wound with a spacer provided between an end surface of a stator tooth and the drive coil so as to reduce stress applied by the coil to slot insulating paper when winding the coil around a tooth of the stator core.

In the stator of the concentrated winding type motor, the drive coil is wound by providing a spacer, which allows a height H to secure an insulation distance, between the end surface of the stator tooth and the drive coil so as to reduce stress applied by the coil to the slot insulating paper when winding the coil around a tooth of the stator core.

In the stator of the concentrated winding type motor, the drive coil is wound by providing a spacer, which has a shape matching a desired shape of a coil end, between the end surface of the stator tooth and the drive coil so as to reduce stress applied by the coil to the slot insulating paper when winding the coil around a tooth of the stator core.

In the stator of the concentrated winding type motor, plate-like slot insulating paper of 0.2 mm to 0.5 mm is disposed on an inner edge of the slot of the stator core, and a portion of the insulating paper that projects from an end surface of the stator is folded a plural number of times toward a tooth of the stator and welded by heating.

In the stator of the concentrated winding type motor, plate-like slot insulating paper of 0.2 mm to 0.5 mm is disposed on an inner edge of the slot of the stator core, and a portion of the insulating paper that projects from an end surface of the stator is folded toward a tooth of the stator, and a reinforcing insulator is provided between the end surface of the stator and the insulating paper.

In the stator of the concentrated winding type motor, the stator core is provided with a skew that is 7.5±5 degrees with respect to a shaft of the stator.

In a rotor of the concentrated winding type motor, a rotor core is provided with a skew that is 7.5±5 degrees with respect to a shaft of the rotor.

In the concentrated winding type motor, both the stator core and the rotor core are provided with skews, skew angles of the two having a relative angle of 7.5±5 degrees.

In the stator of the concentrated winding type motor, a tooth of the stator core is shaped so that a portion on the stator inner diameter side is wider than a slot bottom.

In the rotor of the concentrated winding type motor, a core cut of an outer peripheral portion of a rotor having a magnet inserted and buried is formed so that its shape is different in upper and lower portions thereof in a laminating direction of a lamination thickness of the rotor core.

In the rotor of the concentrated winding type motor, a core cut of an outer peripheral portion of a rotor having a magnet inserted and buried is formed so that its shape is different in upper and lower portions thereof in a laminating direction of a lamination thickness of the rotor core. Furthermore, the inserted magnetic is of the same magnet shared by the upper and lower portions having cuts of different shapes in the laminating direction, or is composed separate magnets for the upper and lower portions.

In the rotor of the concentrated winding type motor, a core cut of an outer peripheral portion of a rotor having a magnet inserted and buried is formed so that its shape is different in upper and lower portions thereof in a laminating direction of a lamination thickness of the rotor core. Furthermore, the inserted magnetic employs separate magnets for the upper and lower portions having different cut shapes in the laminating direction, and the magnets inserted in the outer peripheral portions having different shapes are shifted in a radial direction.

In the stator of the concentrated winding type motor, a plate-like slot insulating paper is disposed on an inner edge of a slot of the stator core, and an aperture width Y of an end surface of the insulating paper that opposes an aperture of the slot is smaller than a width X of a gap between distal end portions of stator teeth.

In the stator of the concentrated winding type motor, a plate-like slot insulating paper is disposed on an inner edge of a slot of the stator core, and the end surface of the insulating paper is extended along the stator tooth distal end portion that opposes an aperture of the slot.

In the stator core of the concentrated winding type motor, a distance between an intersection X and an intersection Y, which are obtained when a bottom point P of a tooth of a stator slot and a bottom point E of a slot are placed on extended perpendiculars that intersect a straight line extending from a center of a stator and passing a center of the tooth, is set so that the bottom point E of the slot lies within a range of −2 mm to +5 mm from the bottom point P of the tooth providing a reference point.

The stator cores are laminated and bound at a caulking spot disposed in a range of an extension of a stator tooth width X in a direction of an outer diameter.

The brushless DC motor and a compressor unit driven by the brushless DC motor are installed in a case to constitute a refrigerant compressor.

An HC type refrigerant is employed as a medium for the compressor.

BRIEF DESCRIPTION OF THE DRAWINGS

FIGS. 6A and 6B provide schematic representations illustrating a relationship between insulating paper and a nozzle of a conventional brushless DC motor.

FIG. 10 is a chart showing a relationship between the rotational angle of the rotor and torque in accordance with the third embodiment.

FIGS. 20A, 20B and 20C provide a front view, a side view, and a top plan view of a junction insert.

DESCRIPTION OF THE PREFERRED EMBODIMENTS

Embodiments in accordance with the present invention will be described in conjunction with the accompanying drawings. First, the descriptions will be given of a first embodiment. FIG. 1 shows a part of a brushless DC motor of a type called "series winding type" or "concentrated winding type." A sheet-like insulator 1 is formed of, for example, a polyester film having a thickness of about 0.2 mm to about 0.5 mm. As it will be discussed hereinafter, the insulator is folded and disposed between teeth or in a slot aperture such that it lies along inner surfaces of the teeth.

Figure 2:
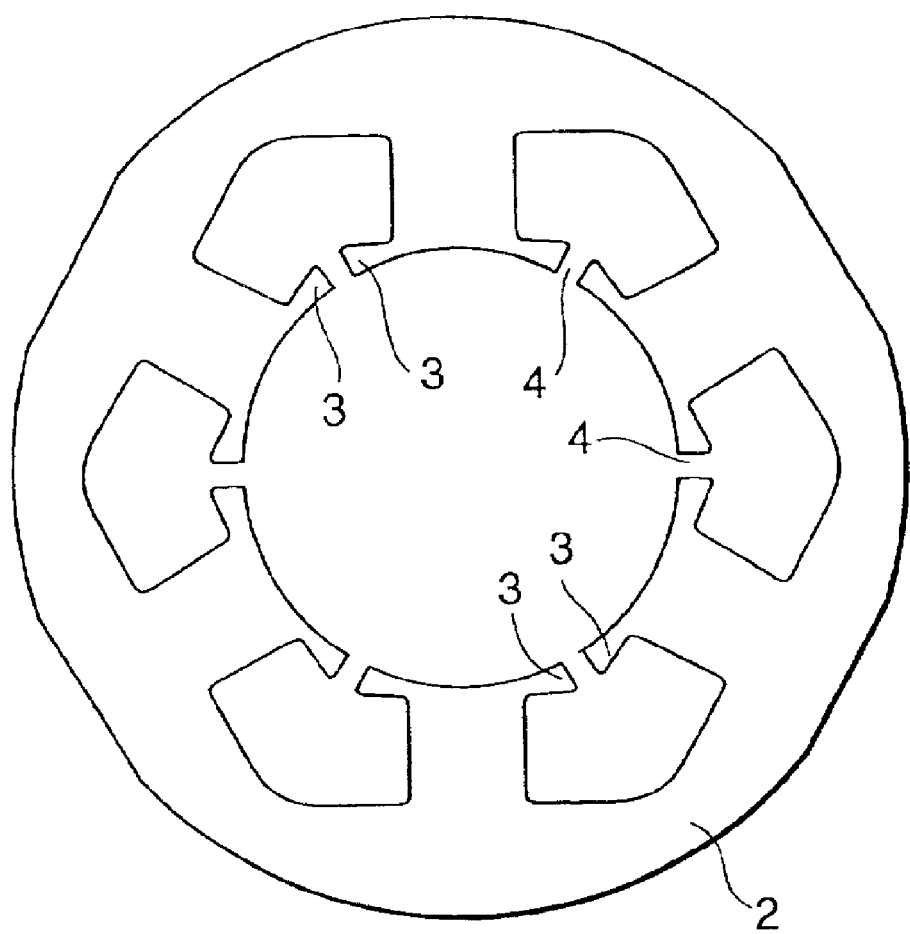
FIG. 2 is a top plan view of a stator iron core of the brushless DC motor in accordance with the present invention.
Figure 3:
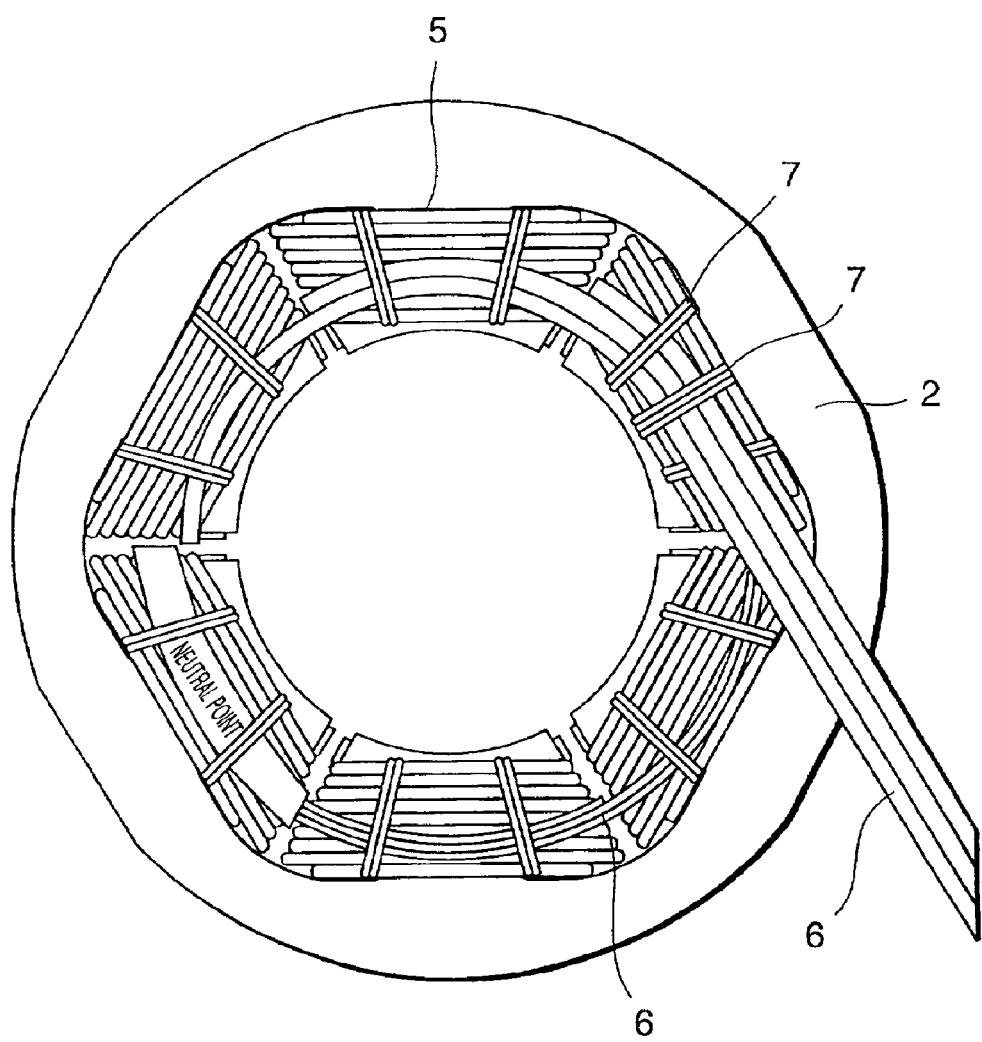
FIG. 3 is a top plan view showing a stator of the brushless DC motor in accordance with the present invention.
Figure 4A:
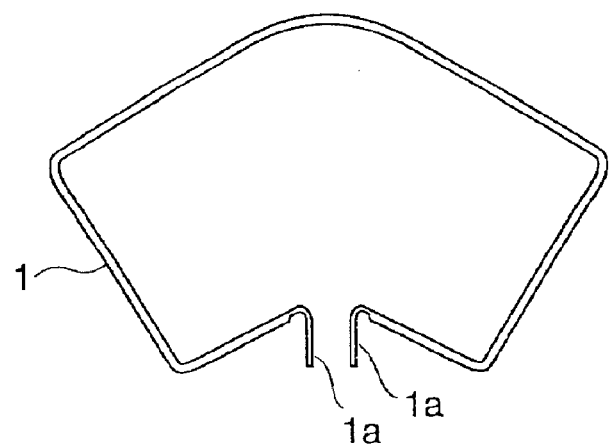
FIGS. 4A and 4B provide schematic representations showing the insulating paper of the brushless DC motor in accordance with the present invention.
Figure 4B:
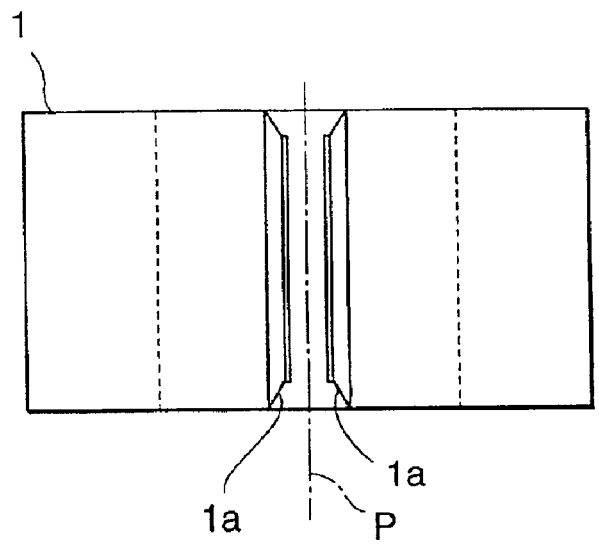
Figure 5:
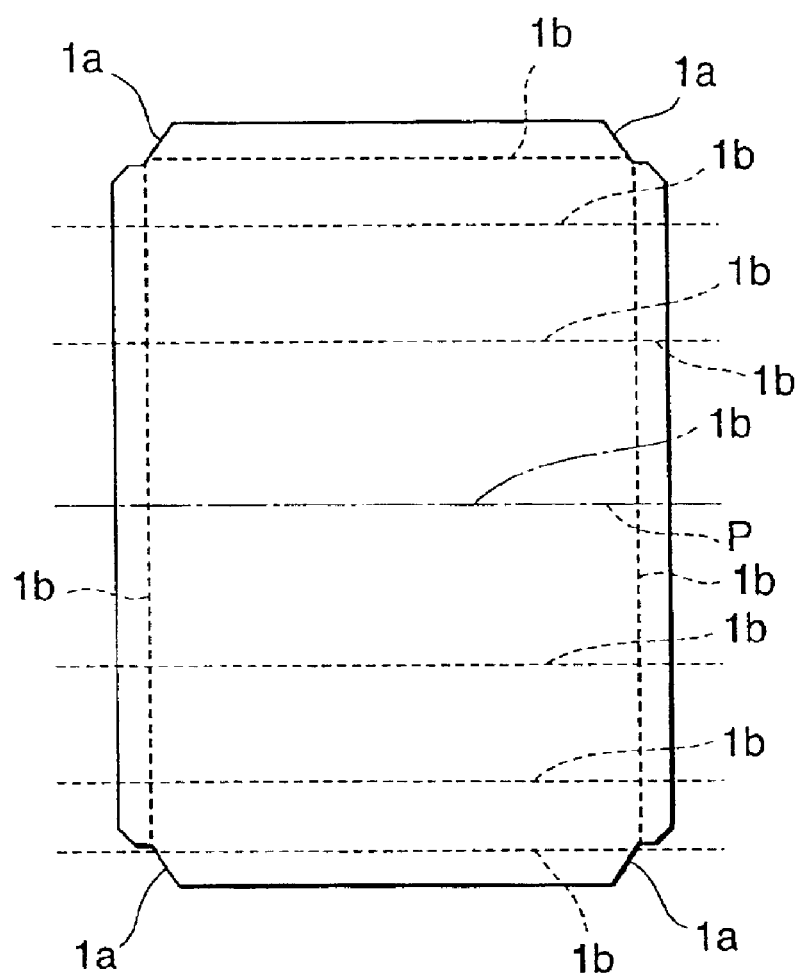
FIG. 5 is a top plan view showing the insulating paper of the brushless DC motor in accordance with the present invention.

The brushless DC motor further has an iron core 2 of a stator, teeth 3 of the iron core, and a slot aperture 4 between teeth. FIG. 1 shows a state wherein no winding has been installed. FIG. 2 shows the iron core of the stator, the iron core being a "six-slot type" that has six slots. An aperture of each of the slots is provided with an insulator. FIG. 3 shows the stator of the brushless Dc motor. The stator and a rotor (not shown) make up the brushless DC motor. Reference numeral 5 denotes a winding, reference numeral 6 denotes an outgoing line connected to the winding, and reference numeral 7 denotes a polyester line that binds an end or a coil end of the winding and the outgoing line. FIG. 4 shows the insulator that has been folded, wherein FIG. 4A is a top plan view thereof, and FIG. 4B is a front view thereof. FIG. 5 shows the insulator before it is folded, wherein slant portions 1a inclined with respect to a central line P between teeth constitutes end portions of the insulator that are positioned between teeth. Reference numeral 1b denotes a folding central line.

Assembly of the brushless DC motor constructed as described above will be explained. The insulator is folded at the folding central lines shown in FIG. 6. The folding central line P may be more accurately described as a central line for curving rather than completely folding. Folding the insulator at every central line forms the insulator into a shape shown in FIG. 4.

When the folded insulator 1 is attached to the slots and the slot apertures 4, the slant portions 1a forming the end portions of the insulator 1 are positioned between the tooth 3 and the tooth 3. At this time, since the insulator 1 is formed symmetrically with respect to the central line, the insulator 1 can be installed without paying attention to its orientation, thus permitting improved assemblability.

Figure 1A:
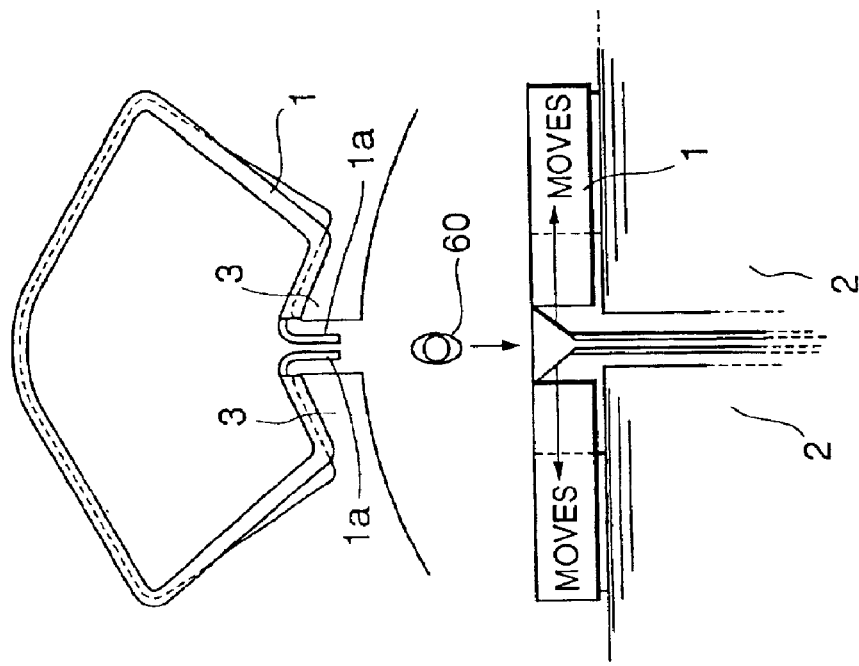
FIGS. 1A and 1B provide schematic representations illustrating a relationship between insulating paper and a nozzle of a brushless DC motor in accordance with the present invention.
Figure 1B:
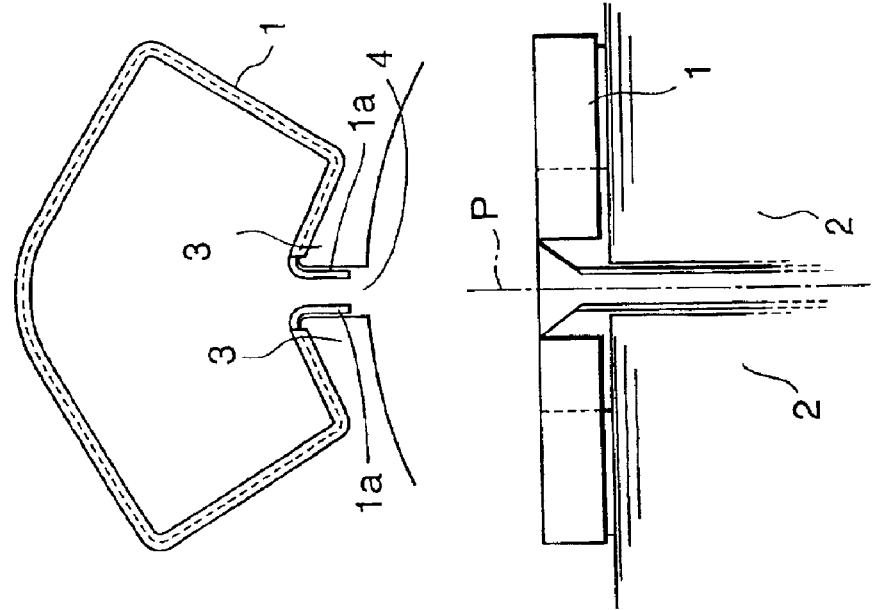

If the insulator has been folded sufficiently or properly, then the slant portions 1a are brought into close contact with the slot aperture 4 as shown in FIG. 1A. If, however, the insulator is incompletely folded, then the slant portions 1a are positioned between the tooth 3 and the tooth 3, namely, in a passage of a nozzle 60 of a machine for installing a winding as shown in FIG. 1B. Even if the slant portions 1a project into the passage of the nozzle, when the nozzle comes in contact with the slant portions 1a, the slant portions 1a move by being pushed in a direction substantially at right angles to a direction in which the nozzle moves, causing the slant portions 1a to come in close contact with inner surfaces of the teeth. This arrangement prevents the insulator from being dislocated or broken by being pushed in the same direction in which the nozzle moves.

When installation of the winding is completed, the outgoing lines 6 connected with the winding 5 are bound together with, for example, upper coil ends, of the winding 5 by a polyester thread. This completes the assembly of a stator of the brushless DC motor.

In the stator, there is a possibility of an insulation failure caused by a coil end or outgoing line that has loosened or bulge out from a slot aperture. Binding the outgoing lines 6 and the coil ends by the polyester line 7 prevents such loosening or sticking out, making it possible to prevent an insulation failure.

The stator and a rotor (not shown) constitute the brushless DC motor. A permanent magnet to be attached to the rotor uses a magnet having a greater BH product, namely, a rare earth magnet, such as a neody-magnet composed of neodymium, iron, and boron or a samarium-cobalt type magnet.

Using such a magnet formed of a rare earth provides an intense magnetic field, allowing the brushless DC motor to be made smaller.

A second embodiment will now be described. In the second embodiment, the brushless DC motor and a compressor unit driven by the brushless DC motor (e.g. a compressor unit of a rotary compressor) are disposed in a single sealed vessel to constitute a closed refrigerant compressor (not shown). As a medium of the refrigerant compressor, hydrocarbon or other HC-based refrigerant is used.

The refrigerant compressor constructed as set forth above minimizes chances of an insulation failure of the brushless DC motor, so that occurrence of a failure of the refrigerant compressor caused by an insulation failure of the brushless DC motor can be minimized. Especially in the case of the refrigerant compressor, its interior cannot be visually checked in case of a failure; therefore, replacing the refrigerant compressor is the only solution if it fails. For this reason, reducing occurrence of failures is particularly useful.

The HC-based refrigerant is employed; hence, even if the refrigerant should leak, the leakage will hardly affect the ozone layer, minimizing danger of affecting terrestrial environment.

Thus, the slant portions are provided at the end portions of the insulator; therefore, even if a nozzle of a machine for installing a winding should hit an insulator while moving between teeth, the insulator moves in a direction for coming in close contact with a slot aperture, i.e., in a direction substantially at right angles to a direction in which the nozzle moves. This arrangement prevents the insulator from moving in the same direction as the nozzle by being pushed by the nozzle, making it possible to minimize a chance of occurrence of an insulation failure caused by a damaged or dislocated insulator.

When the insulator is formed to be symmetrical with respect to a central line between teeth, the insulator can be installed in an opposite direction also, so that the insulator can be installed without paying attention to its orientation, permitting easier assembly.

There is a danger of an insulation failure caused by a coil end or outgoing line that becomes loose or sticks out of a slot aperture. Binding coil ends or a coil end and an outgoing line by using a polyester thread prevents such loosening or sticking out so as to prevent an insulation failure.

Employing a rare earth for the permanent magnet provided on the rotor of a brushless DC motor produces an intense magnetic field, allowing a reduced size of the brushless DC motor to be achieved.

Since the brushless DC motor is capable of minimizing the occurrence of insulation failures, when the brushless DC motor and a compressor unit driven by the brushless DC motor are installed in a case, the occurrence of a failure of a refrigerant compressor attributable to an insulation failure of the brushless DC motor can be accordingly minimized.

Moreover, when an HC-based refrigerant is employed for a medium to be compressed, even if the refrigerant should leak, the leakage will not affect the ozone layer, allowing minimized impact on the terrestrial environment.

A concentrated winding type brushless DC motor in accordance with a third embodiment will now be described with reference to FIG. 7 through FIG. 10.

Figure 11A:
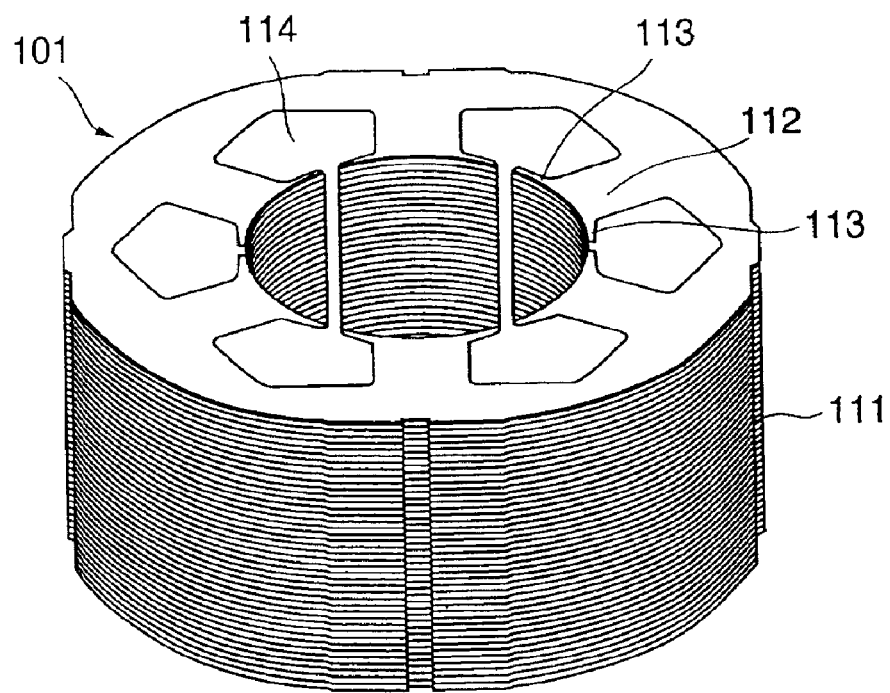
FIGS. 11A and 11B are diagrams showing a stator and a rotor of a concentrated winding type brushless DC motor.
Figure 11B:
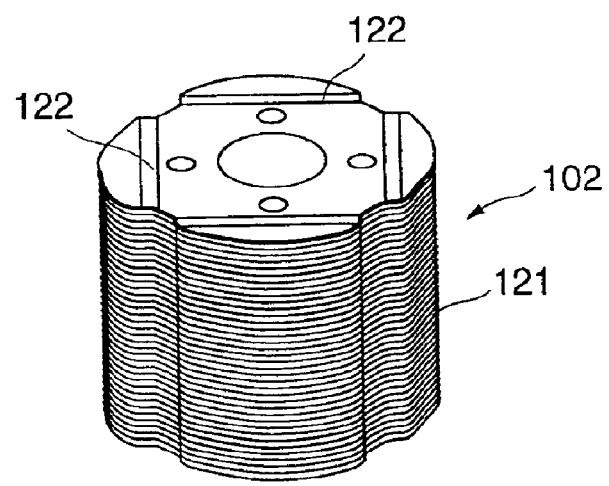
Figure 12:
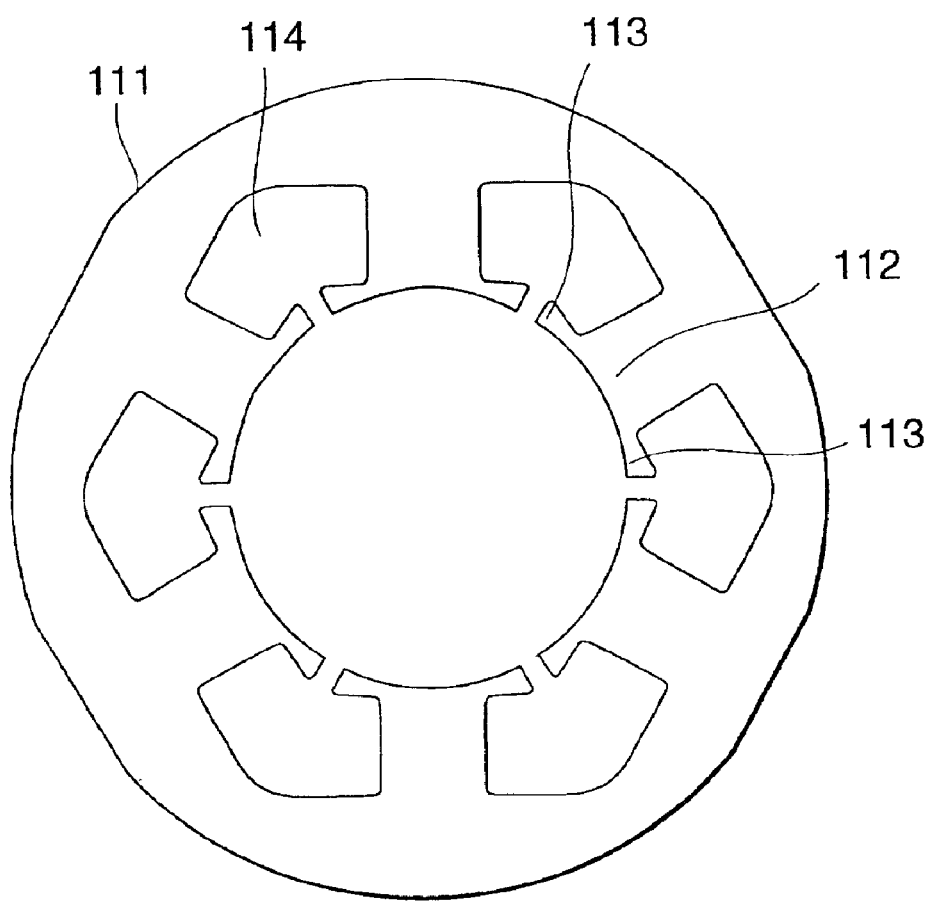
FIG. 12 is a top plan view of a conventional stator core.

Referring to FIG. 11 and FIG. 12, a conventional concentrated winding type brushless DC motor is constructed by a stator 101 and a rotor 102. The stator has a shape as shown in FIG. 11A, wherein stator plates or silicon steel plates are laminated to form a stator core 111. The stator core 111 is equipped with teeth 112. Each of the teeth 112 has a predetermined width and is provided with tooth distal end portions 113 on its both sides along a surface of the rotor. A drive coil (not shown) is directly wound around the tooth 112 by making use of a space of a slot so as to form a magnetic pole of the stator 101 by the so-called concentrated series winding method. In this example, a 4-pole, 6-slot stator is shown.

With this arrangement, the stator can be formed to be smaller than the stator of a distributed winding type brushless DC motor. The shape of the stator core 111 is as shown in the top plan view of FIG. 12. The tooth distal end portions 113 are formed on both sides of the tooth 112 along the surface of the rotor at equal intervals relative to the rotor.

The rotor 102 has a shape as shown in FIG. 11B, a rotor core 121 being formed by laminating silicon steel plates. A permanent magnet 122 is buried in the rotor core 121. The permanent magnet 122 of the rotor 102 may use a standard ferrite type magnet. For reducing a size of a motor, a magnet having a greater BH product, namely, a rare earth magnet, such as a neody-magnet composed of neodymium, iron, and boron or a samarium-cobalt type magnet may be used.

The rotor 102 is inserted in a center of the stator 101 thus formed to construct the concentrated winding type brushless DC motor. A torque characteristic of the brushless DC motor in operation exhibits a waveform including many higher harmonic components as indicated by a solid line in a relationship between a rotational angle of the rotor and torque of the motor shown in FIG. 10, and the torque greatly fluctuates. This has been attributable to vibration of the motor in operation.

Forming a rotor skew and a stator skew or the like may be one of the measures for controlling variations in torque of the motor. In the rotor with the buried magnet, however, it is difficult to provide the skews in the aspects of punching of a core and the manufacture of magnets. Furthermore, in the case of the concentrated winding type brushless DC motor, the stator skew deteriorates characteristics at a high speed revolution in some cases.

Figure 7A:
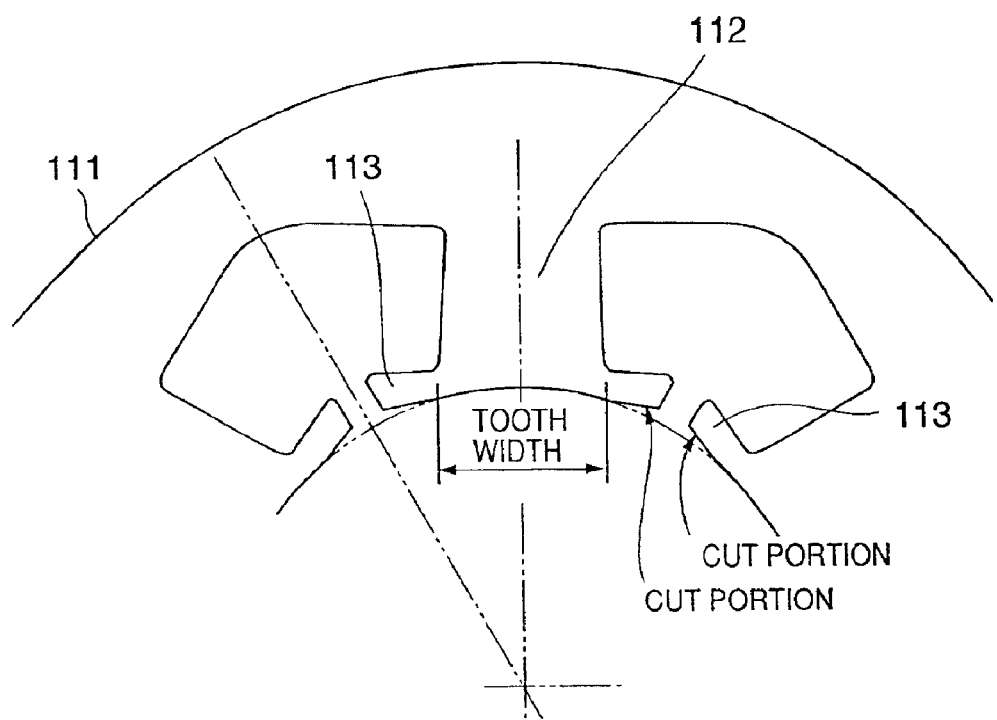
FIGS. 7A and 7B provide enlarged views showing a part of a stator core in accordance with a third embodiment.

Referring now to FIG. 7, a concentrated winding type brushless DC motor in accordance with the present invention that has solved the aforesaid technological difficulties and has reduced fluctuating torque will now be described. FIG. 7A is an enlarged view of a part of the stator core 111, focusing on one tooth 112. The tooth 112 has a predetermined tooth width and has tooth distal end portions 113 that are formed on a portion of the tooth on an inner diameter side and extended as far as apertures, excluding a tooth body.

Figure 7B:
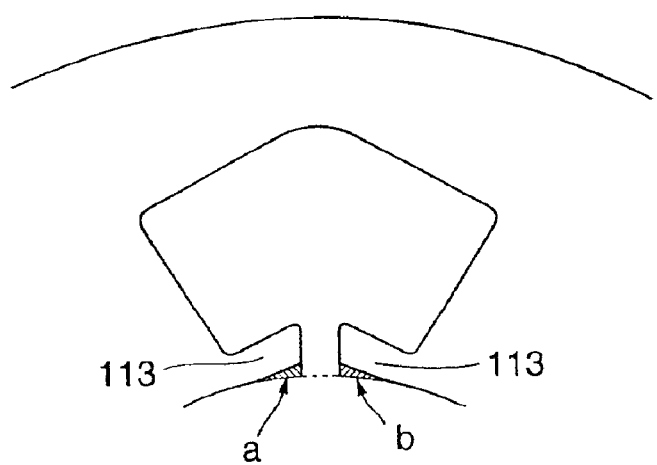
Figure 8:
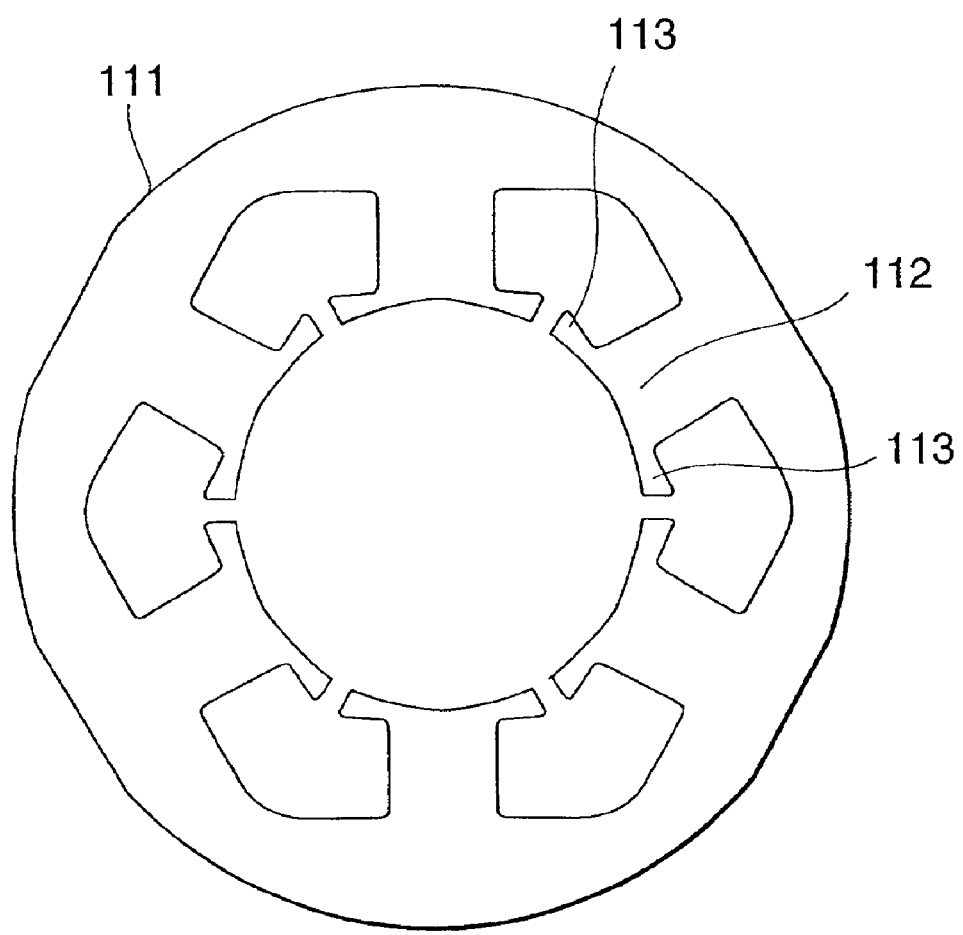
FIG. 8 is a top plan view of the stator core in accordance with the third embodiment.

Portions a and b of the tooth distal end portions 113 extending from both sides of the tooth 112 are cut off as shown in FIG. 7B. Cutting off only one side, e.g., the portion a, of the tooth distal end portion 113 in the direction in which the rotor 102 rotates is adequate; however, the other portion, b, of the tooth distal end portion 113 is also cut off so as to allow the rotor 102 to be inserted from either direction of the stator 101 when assembling the motor. Thus, cutting the tooth distal end portions 113 on both sides exerts negligible influences on the torque characteristics of the motor.

A top plan view of the stator core 111 formed as described above is shown in FIG. 8. The distance from the rotor is greater by the cut portions at the tooth distal end portions 113 rather than being uniformly equidistant from the rotor along a surface of the rotor. With this arrangement, magnetic resistance at the cut portions is greater, and magnetic flux will be uniform without concentration of magnetic flux at the tooth distal end portions 113 in the direction in which the rotor 102 rotates.

Figure 9:
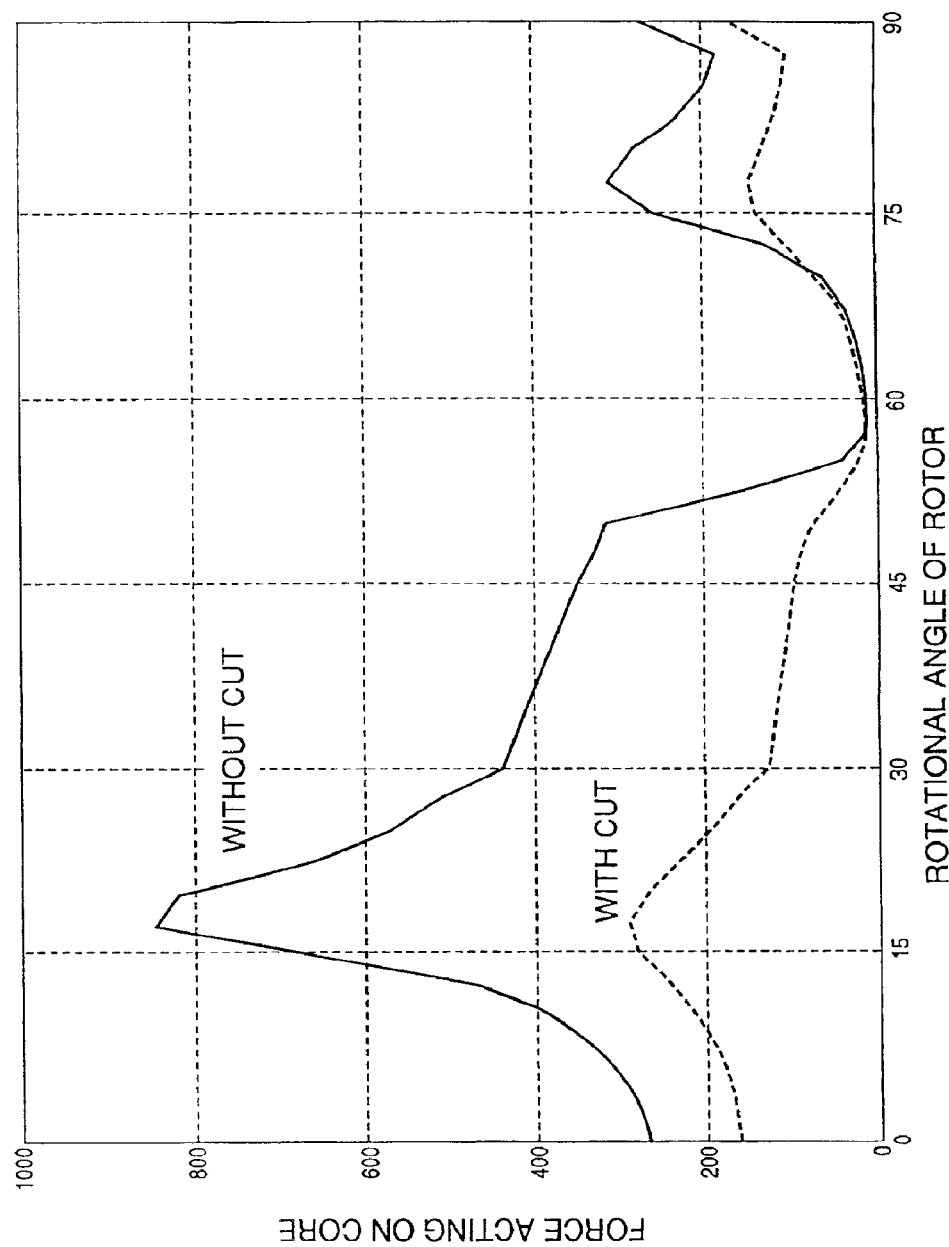
FIG. 9 is a chart showing a relationship between a rotational angle of a rotor and a force acting on the core in accordance with the third embodiment.

Accordingly, a relationship between a rotational angle of the rotor of the motor and a force acting on a core or a central side of the core will be as shown in FIG. 9. When no cut is provided, a peak value will be greater as indicated by a solid line, and variations in force also increase with resultant time-dependent variations, leading to vibration of the motor. When the cuts are provided as in the present invention, the peak value will be smaller, drawing a relatively gentle curve; hence, variations in the force will be reduced with resultant less time-dependent variations, permitting vibration of the motor to be restrained.

As a result, the relationship between the rotational angle of the rotor and the torque of the motor will be as shown by a solid line b in FIG. 10. The waveform is smoother with less higher harmonic components. Variations in torque can be reduced and vibration of the motor in operation can be accordingly reduced.

As set forth above, the present invention permits the stator of the brushless DC motor to be made smaller. In the tooth distal end portions of the stator core of the concentrated winding type motor, the tooth portions that are formed on the inner diameter side and extended as far as the apertures, excluding the tooth body, are provided with the cuts. This arrangement produces a smoother waveform with less higher harmonic components, and permits reduced variations in torque and reduced vibration of the motor in operation.

Figure 13:
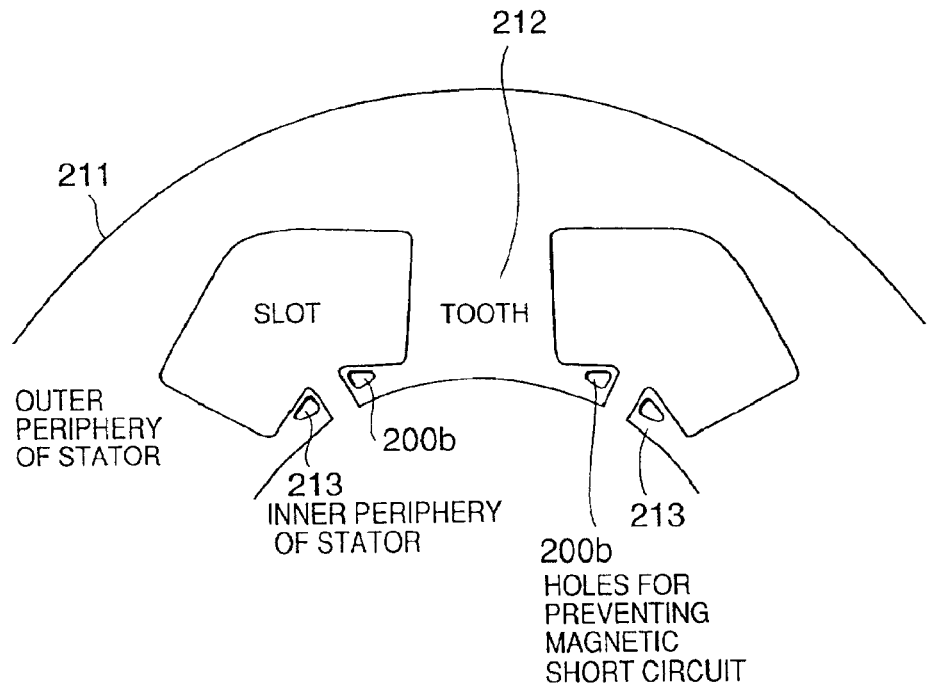
FIG. 13 is an enlarged view of a part of a stator core in accordance with a fourth embodiment.

Referring now to FIG. 13, a concentrated winding type brushless DC motor in accordance with a fourth embodiment will be described.

Figure 17:
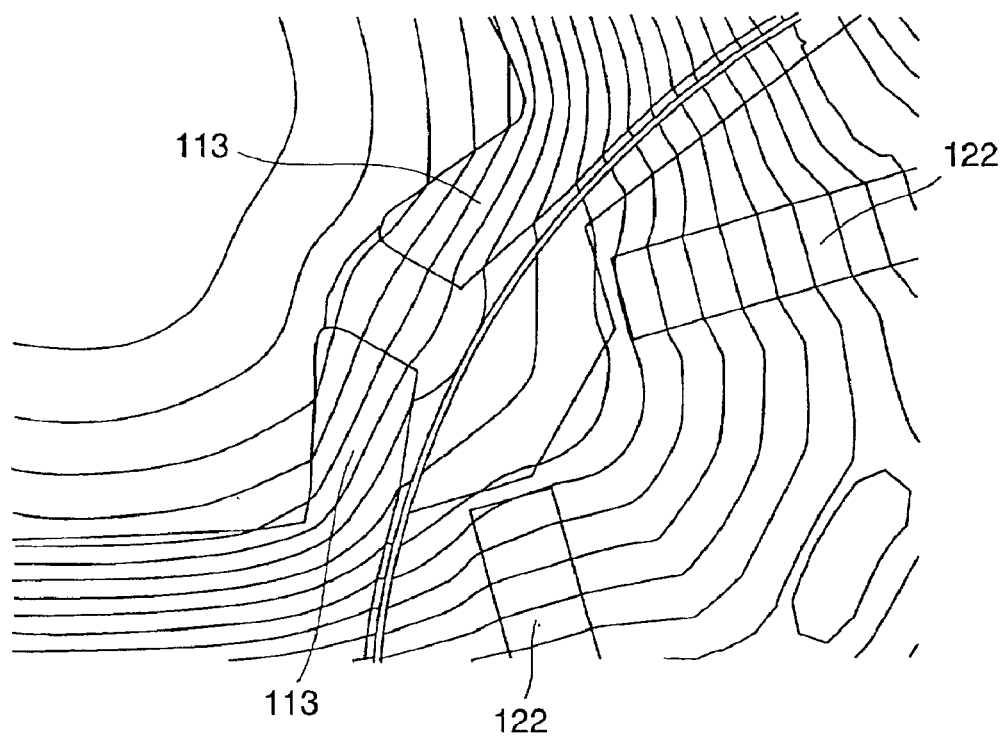
FIG. 17 is a diagram showing magnetic flux distribution of a conventional stator and rotor.

A conventional concentrated winding type brushless DC motor is formed as illustrated in FIG. 11 and FIG. 12 as set forth above. The rotor 102 is inserted in the center of the stator 101 formed as described above, then current is supplied to the drive coil of the stator 101 to magnetize the magnet 122 of the rotor 102, thus completing the concentrated winding type brushless DC motor. There has been a shortcoming in that, when magnetizing the brushless DC motor, many short circuit magnetic fluxes are generated between the tooth distal end portions 113 of the stator that oppose each other, leaving less magnetic fluxes that act on a magnet 222 of the rotor, as can be seen from a magnetic flux distribution of FIG. 17.

As simple measures for reducing the short circuit magnetic fluxes between the opposing tooth distal end portions 113, the distance between the opposing tooth distal end portions 113 could be increased or the lengths of the tooth distal end portions 113 could be decreased. However, the drive coil is concentratedly wound in the spaces of the slots of the tooth 112 of the stator core 111; hence, the tooth distal end portions 113 are required to have a predetermined length to prevent a coil from slipping off. For this reason, it has been impossible to make the tooth distal end portions 113 extremely shorter to prevent the magnetic short circuit.

Referring to FIG. 13, the concentrated winding type brushless DC motor that solves the technological difficulties described above will be described. This brushless DC motor reduces the short circuit magnetic fluxes generated between the opposing tooth distal end portions of the stator core when magnetizing a magnet of a rotor of a motor, thus permitting the rotor magnet to be efficiently magnetized.

FIG. 13 is an enlarged view of a part of a stator core 211, a focus being placed on a single tooth 212. The tooth 212 has a predetermined tooth width and has tooth distal end portions 213 which are formed on a portion of the tooth on an inner diameter side, excluding the tooth body, and extend as far as apertures. A part of the tooth distal end portions 213 formed so that they extend on both sides of the tooth 212 is provided with magnetic short circuit preventing holes 200a and 200b to increase magnetic resistance between the opposing tooth distal ends 213 of the stator core 211.

Figure 16:
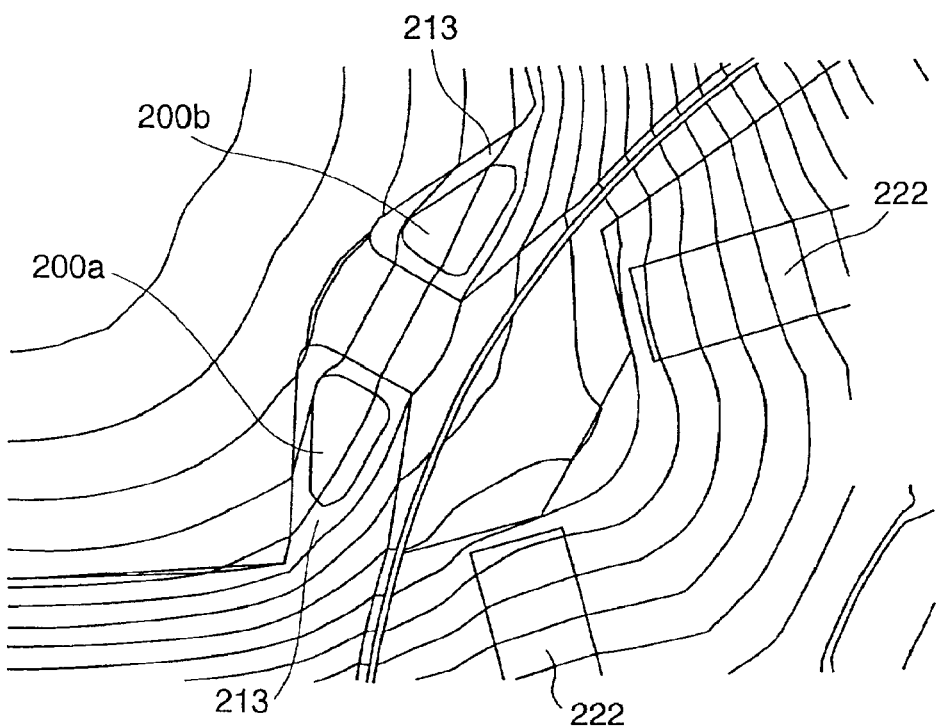
FIG. 16 is a diagram showing magnetic flux distribution of a stator and a rotor in accordance with the present invention.

With this arrangement, at the time of magnetizing the brushless DC motor, the short circuit magnetic fluxes between the opposing tooth distal end portions 213 of the stator are reduced, and there will be more magnetic fluxes acting on the magnet 222 of the rotor, as indicated by magnetic flux distribution of FIG. 16. As a result, when the magnet of the rotor of the motor is magnetized, the short circuit magnetic fluxes between the opposing tooth distal end portions of the stator core can be reduced, while the magnetic fluxes acting on the magnet of the rotor can be increased, permitting efficient magnetization of the magnet of the rotor.

Figure 14:
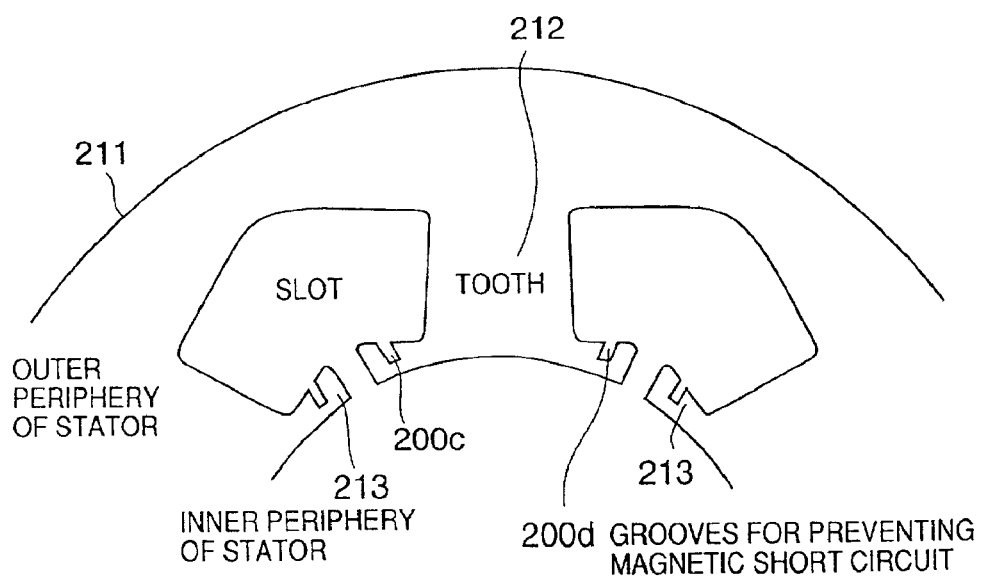
FIG. 14 is an enlarged view of a part of a stator core in accordance with a fifth embodiment.

FIG. 14 shows a fifth embodiment in accordance with the present invention. Slit-like grooves 200c and 200d for preventing magnetic short circuit are formed in a part of opposing surfaces of the tooth distal end portions 213 that extend on both sides of the tooth 212. These slit-like grooves increase the magnetic resistance between the opposing tooth distal end portions 213 of the stator core 211.

With this arrangement, at the time of magnetizing the brushless DC motor, the short circuit magnetic fluxes between the opposing tooth distal end portions 213 of the stator are reduced, and there will be more magnetic fluxes acting on the magnet 222 of the rotor. As a result, when the magnet of the rotor of the motor is magnetized, the short circuit magnetic fluxes between the opposing tooth distal end portions of the stator core can be reduced, while the magnetic fluxes acting on the magnet of the rotor can be increased, permitting efficient magnetization of the magnet of the rotor to be achieved.

Figure 15:
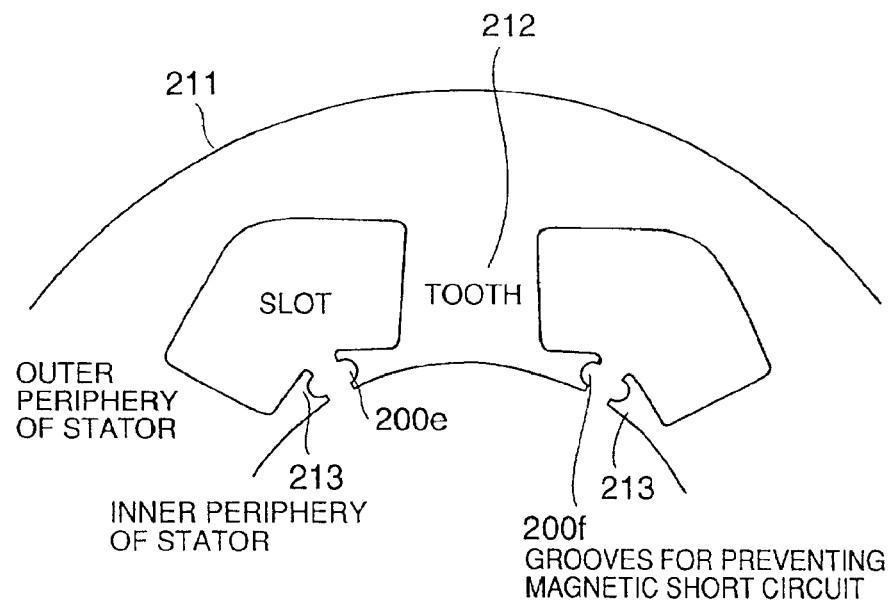
FIG. 15 is an enlarged view of a part of a stator core in accordance with a sixth embodiment.

FIG. 15 shows a sixth embodiment in accordance with the present invention. Notch-like grooves 200e and 200f for preventing magnetic short circuit are formed in a part of the tooth distal end portions 213 that extend on both sides of the tooth 212. These notch-like grooves virtually increase the aperture between the opposing tooth distal end portions 213 of the stator core 211 thereby to increase the magnetic resistance therebetween.

With this arrangement, at the time of magnetizing the brushless DC motor, the short circuit magnetic fluxes between the opposing tooth distal end portions 213 of the stator are reduced, and there will be more magnetic fluxes acting on the magnet 222 of the rotor. As a result, when the magnet of the rotor of the motor is magnetized, the short circuit magnetic fluxes between the opposing tooth distal end portions of the stator core can be reduced, while the magnetic fluxes acting on the magnet of the rotor can be increased, permitting efficient magnetization of the magnet of the rotor to be achieved.

Thus, the present invention enables a stator of a brushless DC motor to be made smaller. The distal end configurations of teeth of a stator core in accordance with the invention make it possible to increase magnetic resistance between opposing tooth distal end portions of the stator core so as to reduce short circuit magnetic fluxes between the tooth distal end portions and to increase magnetic fluxes acting on a rotor magnet, thus permitting the rotor magnet to be efficiently magnetized.

Referring now to FIG. 20 through FIG. 25, a concentrated winding type brushless DC motor according to a seventh embodiment will be described.

The conventional concentrated winding type brushless DC motor is formed as shown in FIG. 11 and FIG. 12 as described above. The rotor 102 is inserted at the center of the stator 101 to construct the concentrated winding type brushless DC motor. In the past, to process an outgoing line of the drive coil of the concentrated winding type brushless DC motor, the outgoing line is secured to a junction insert formed of a resinous molding which is provided in an axial direction of the motor on an outer periphery side of a coil end and which is integrally formed with a slot insulator.

The junction insert composed of the resinous molding uses a great amount of a resin to make the molding thick in order to secure strength, and requires time and effort for assembly. In addition, generation of an oligomer adversely affects reliability, so that the junction insert has not been entirely ideal for use with a motor for a closed compressor.

Figure 21:
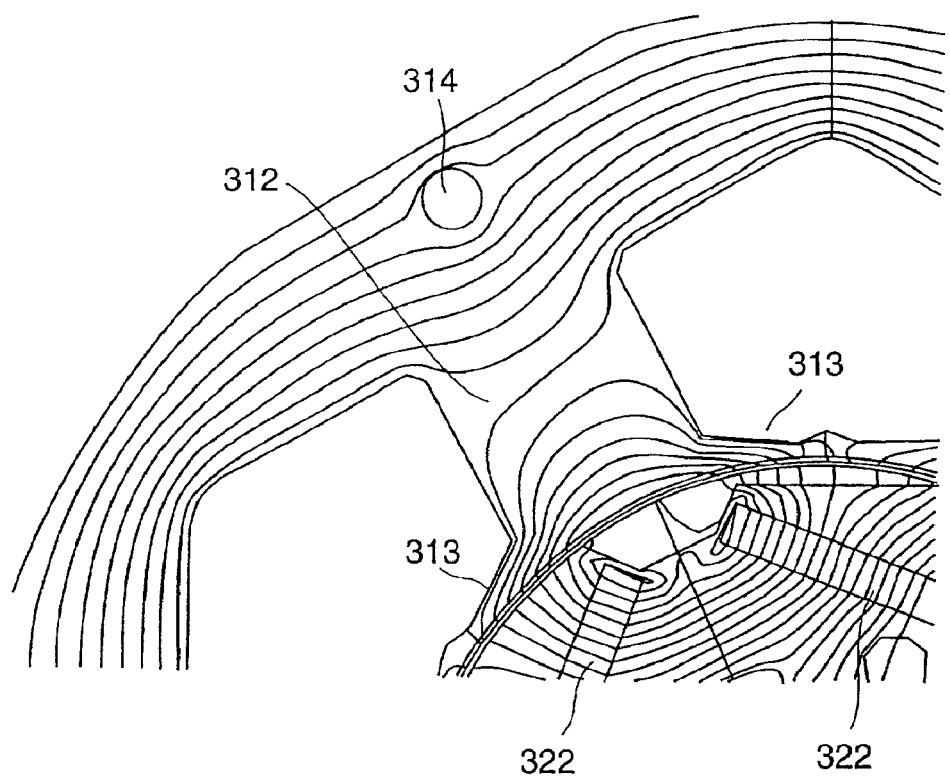
FIG. 21 is a state diagram of a magnetic flux distribution of a stator and a rotor.
Figure 22:
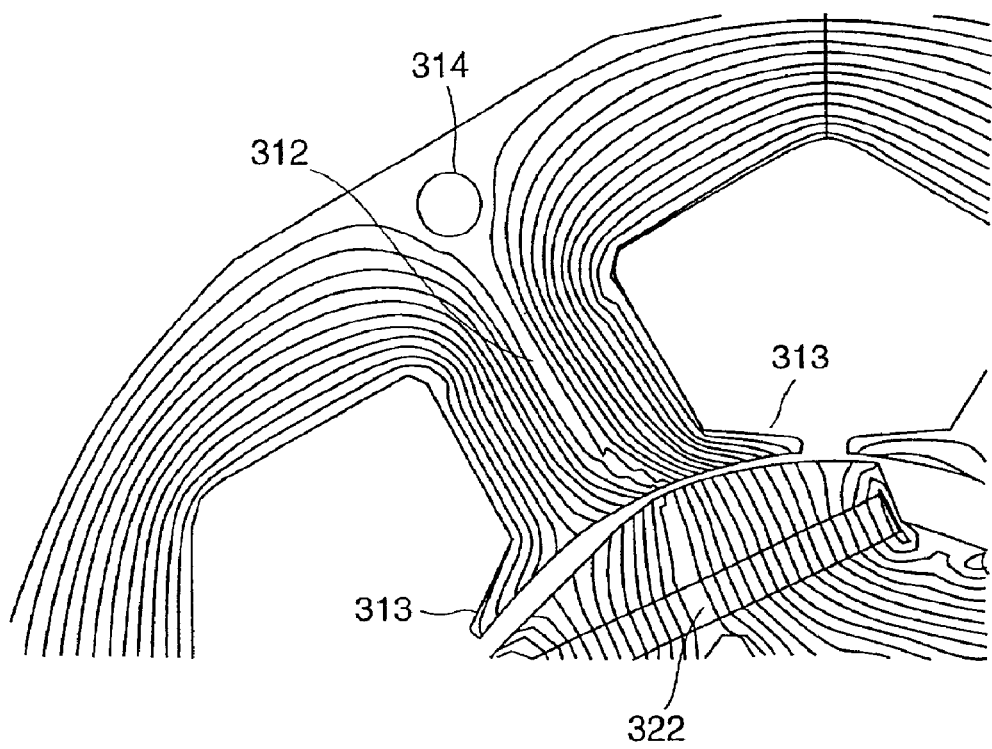
FIG. 22 is a state diagram of a magnetic flux distribution of a stator and a rotor.

Referring to the accompanying drawings, the concentrated winding type brushless DC motor in accordance with the present invention that features higher reliability and higher productivity will be described. FIG. 21 and FIG. 22 are state diagrams illustrating magnetic flux distributions in a stator and a rotor. Referring to FIG. 21, when magnets 322 and 322 of the rotor are located as shown in relation to a tooth 312 of a stator core, the intensity of magnetism is weak at the tooth 312 because it is positioned between the magnets. When attention is paid to a magnetic path in this case, a spot indicated by reference numeral 314 exerts less influences on a passage of magnetic fluxes.

When a magnet 322 of the rotor is located as shown in FIG. 22 with respect to the tooth 312 of the stator core, the magnet fully faces the tooth 312, so that the intensity of magnetism is the highest. When attention is paid to the magnetic path, the spot indicated by reference numeral 314 is irrelevant to and therefore exerts no influences on the passage of magnetic fluxes.

Accordingly, the position 314 can be said to be best suited for providing an inserting hole for a jig for processing an outgoing line, which hole is opened in the axial direction of the motor. According to this invention, the hole is utilized to position and drill the hole for inserting the jig for processing the outgoing line.

Figure 18:
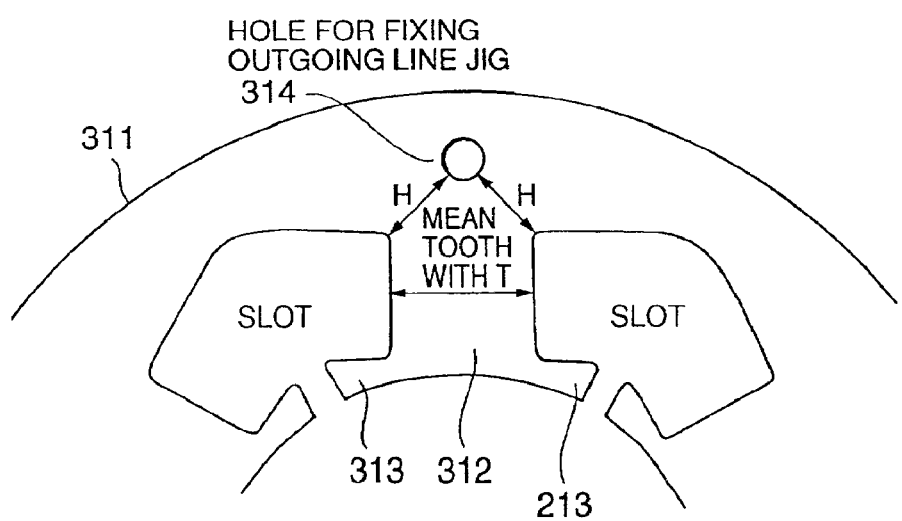
FIG. 18 is an enlarged view of a part of a stator core in accordance with a seventh embodiment.

FIG. 18 is an enlarged view of a part of a stator core 311, a focus being placed on a single tooth 312. The tooth 312 has a predetermined tooth width and has tooth distal end portions 313 which are formed, extending on both sides of the tooth 312, on a portion of the tooth on an inner diameter side excluding the tooth body and which extend to apertures.

Figure 19:
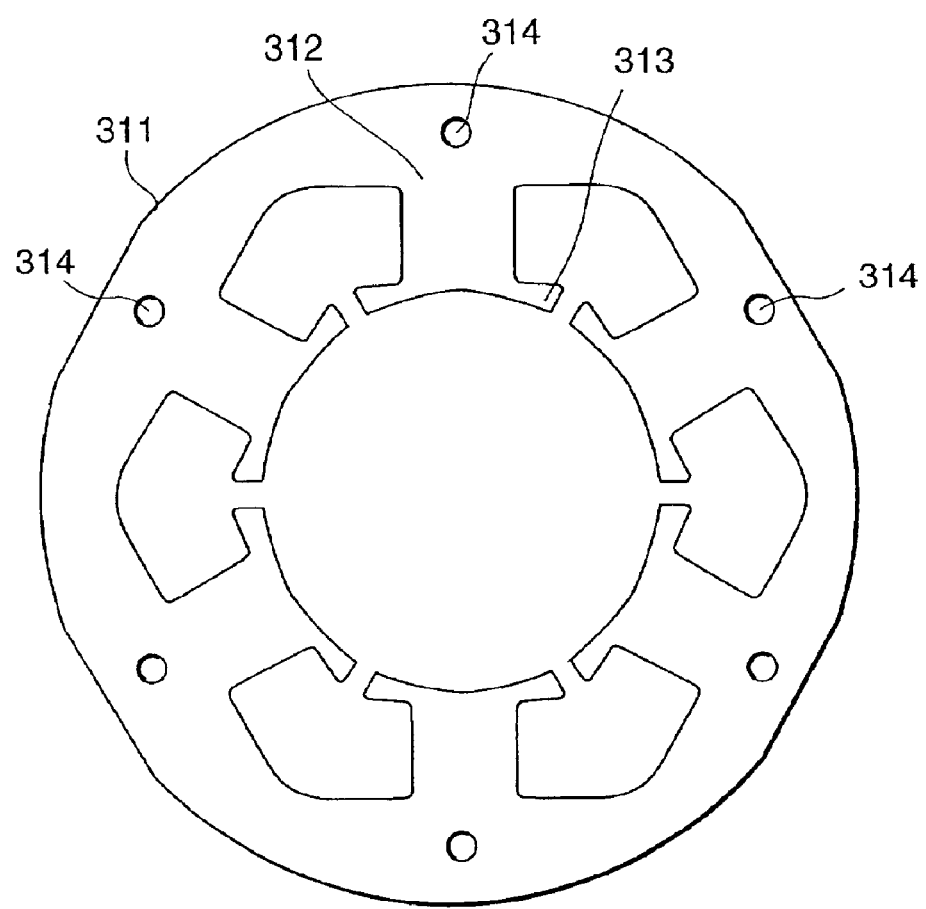
FIG. 19 is a top plan view of the stator core.

The position of the jig inserting hole 314 for processing the outgoing line is on an outer periphery side and at a center of the tooth 312 of the stator core 311. The position is decided so that the following relationship is established between a distance (H) from the tooth 312 to a corner of a bottom of a slot and a mean tooth width (T) of the tooth 312: $H \geq T/2$. Thus, the jig inserting hole 314 for processing the outgoing line is drilled in the axial direction of the motor. The top plan view of the stator core 311 thus formed is as shown in FIG. 19.

Then, only a core press-fit portion of a junction insert 303 shown in FIG. 20 is inserted in the jig inserting hole 314 and secured, and a drive coil (not shown) is directly wound around the tooth 312 by making use of spaces of the slots. Thereafter, the outgoing line of the drive coil is secured to the junction insert to construct the stator core of the concentrated winding type brushless DC motor. It is not necessary to provide every tooth with the jig inserting hole 314 and the junction insert 303; the jig inserting hole 314 and the junction insert 303 may be provided on an arbitrary number of stator teeth 312.

The junction insert for processing an outgoing line will now be described in detail with reference to FIG. 20, wherein FIG. 20A is a front view of the junction insert 303, FIG. 20B is a side view thereof, and FIG. 20C is a bottom view thereof. The junction insert 303 is formed of a resinous insulating material, and an inserting shaft 331 of the junction insert 303 has a one-way slippage-proof means 333 that permits insertion, while it resists when pulled in a draw-out direction. Furthermore, an annular outgoing line securing means 332 that has a partial cut 334 is formed on a top of the junction insert 303. The outgoing line of the drive coil is pushed into an outgoing line through hole from the cut 334 of the annular outgoing line securing means 332 and secured.

Thus, according to the invention, the stator of the brushless DC motor can be made smaller, and the jig inserting hole for processing an outgoing line can be provided on an outer periphery side at the center of a stator tooth of the stator core of the concentrated winding type motor, without affecting a magnetic circuit. Moreover, although the junction insert inserted in the jig inserting hole is formed of a resinous insulating material, but uses a smaller amount of resin. This arrangement permits easier assembly and freedom from oligomers, and also enables improved reliability and productivity of a motor to be achieved when used with a motor for a closed type compressor.

Referring now to FIG. 27 through FIG. 29, a concentrated winding type brushless DC motor in accordance with an eighth embodiment will be described.

Figure 25:
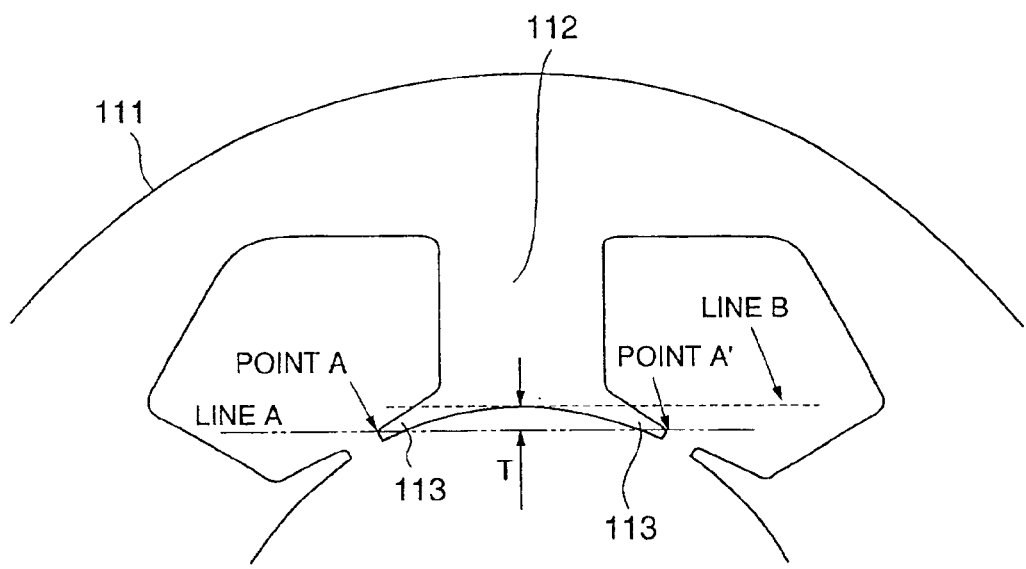
FIG. 25 is an enlarged view of a part of a conventional stator core.

A conventional concentrated winding type brushless DC motor is formed as illustrated in FIG. 11 and FIG. 12 as set forth above. The rotor 102 is inserted in the center of the stator 101 formed as described above to construct the concentrated winding type brushless DC motor. When the drive coil (not shown) is directly wound around the tooth 112 of the stator core 111 by making use of the spaces of the slots to form a magnetic pole of the stator 101 by a concentrated winding method, the distal ends of the tooth distal end portions 113 of the stator core 111 will look as shown in FIG. 25. A distance T from a line A connecting a distal point A and a distal point A' of the tooth distal end portion 113 to a tangent line B of an inner diameter of the tooth 112 will be $T \leq 0$ (closer to the inner diameter of the stator), and one slot pitch is large, 60 degrees. Hence, there have been some cases where, if the drive coil is wound up to a vicinity of the aperture, then an inner side of the coil end extends beyond the inner diameter of the stator.

Hitherto, in order to prevent the coil end from extending beyond the inner diameter of the stator, a molding composed of a resin or the like that is integrally formed with slot insulating paper to provide a wall on the inner diameter side of the stator. The structure formed by the resinous molding for preventing a coil from extending beyond the inner diameter has been posing a problem of high occupancy of a coil and a problem in that, when a thicker coil is used, higher stress is applied to the resinous molding with a resultant fall or crack in the molding during winding. Hence, increasing the thickness of the resinous molding to secure sufficient strength has been presenting a problem of occurrence of an oligomer from a resin in the case of a closed type compressor employing a refrigerant.

Referring to the accompanying drawings, descriptions will now be given of a concentrated winding type brushless DC motor in accordance with the present invention that is capable of preventing an inner side of a coil end from extending beyond an inner diameter of a stator even when a drive coil is wound up to a vicinity of an aperture of a tooth of a stator core to form a magnetic pole of a stator.

Figure 23:
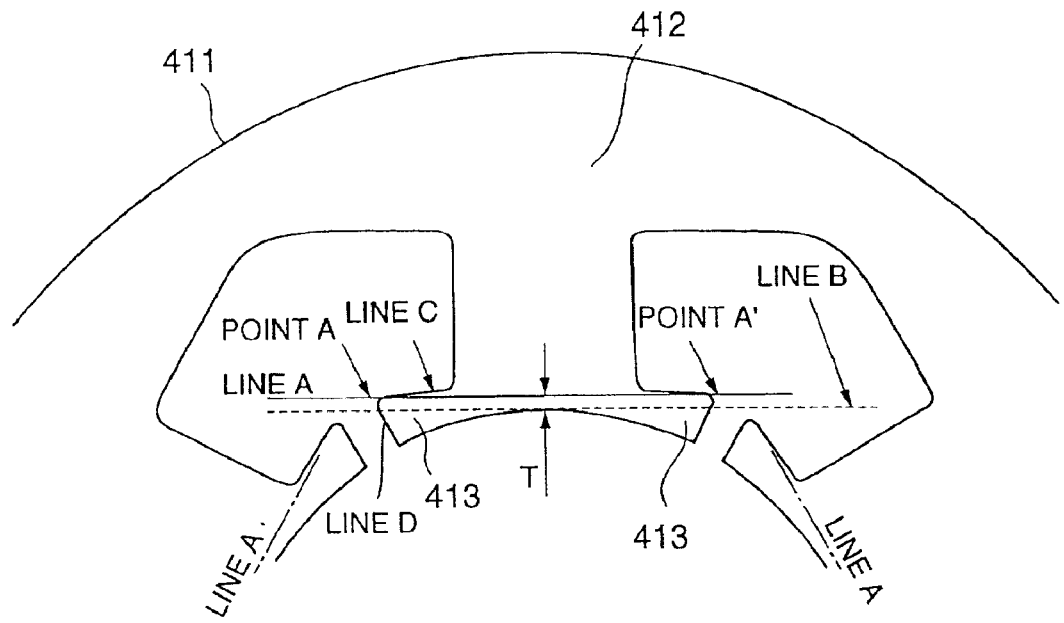
FIG. 23 is an enlarged view of a part of a stator core of an eighth embodiment.
Figure 24:
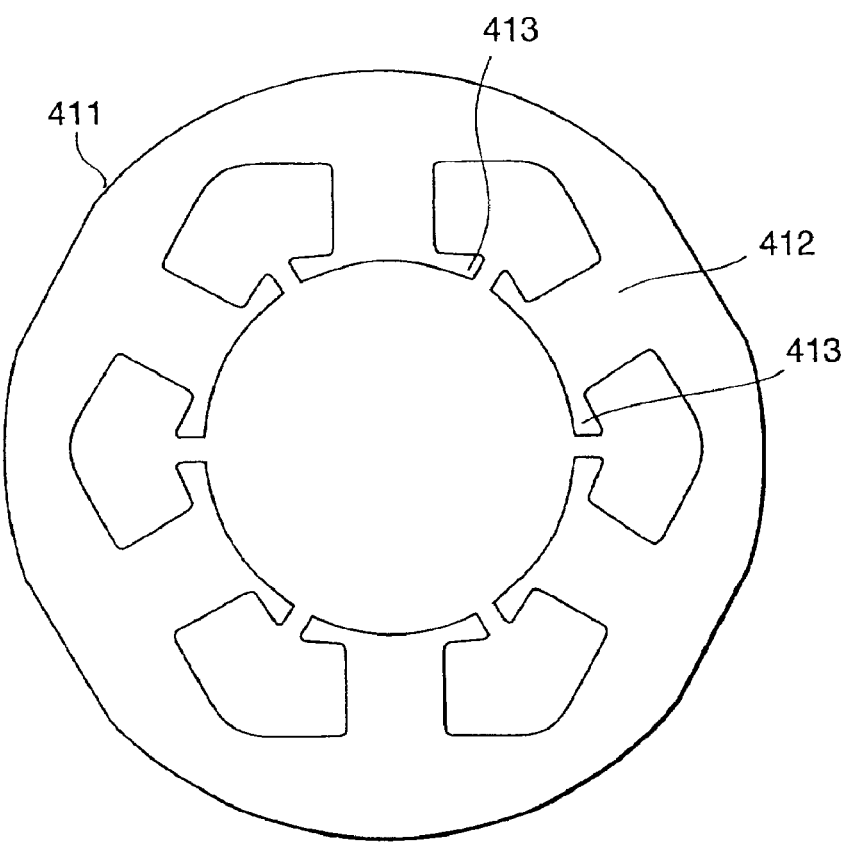
FIG. 24 is a top plan view of the stator core of the eighth embodiment.

FIG. 23 is an enlarged view of a part of a stator core 411, a focus being placed on a single tooth 412. The tooth 412 has a predetermined tooth width and is provided with tooth distal end portions 413 which are formed on right and left sides of a portion of the tooth on the inner diameter side excluding the tooth body and which extend as far as apertures. A right distal end is denoted as a point A' and a left distal end is denoted as a point A that are intersections of a line D and a line C of the tooth distal end portions 413 of the stator, and a tangent line B of the inner diameter of the tooth of a line A that connects the above two points provides a reference. The tooth distal end portions are formed so that a distance T from the tangent line B is T≧0 (closer to the outer diameter of the stator).

Forming the tooth distal end portions 413 of the stator as described makes it possible to prevent the inner side of the coil end from extending beyond the inner diameter of the stator even if the drive coil is wound up to the vicinity of the aperture of the tooth of the stator core when forming a magnetic pole of the stator.

Thus, according to the present invention, a stator of a brushless DC motor can be made smaller, and a concentrated winding type brushless DC motor can be achieved that is capable of preventing an inner side of a coil end from extending beyond an inner diameter of a stator, without using a resinous molding, even if a drive coil is wound up to the vicinity of an aperture of a tooth of a stator core when forming a magnetic pole of the stator.

Figure 26:
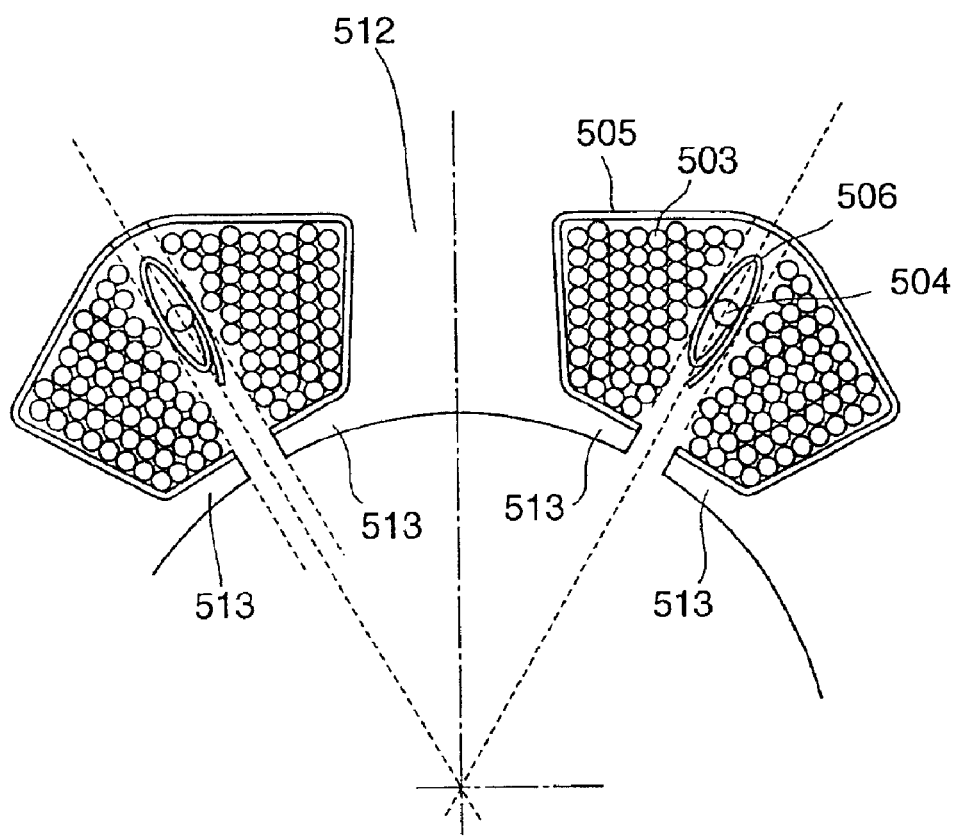
FIG. 26 is an enlarged view of a part of a stator core of a ninth embodiment.

Referring now to FIG. 26, a concentrated winding type brushless DC motor according to a ninth embodiment will be described.

The conventional concentrated winding type brushless DC motor is formed as illustrated in FIG. 11 and FIG. 12 as set forth above. The rotor 102 is inserted in the center of the stator 101 formed as described above to construct the concentrated winding type brushless DC motor. This enables the stator to be made smaller than a stator of a distributed winding type brushless DC motor. When directly winding the drive coil around the tooth 112 of the stator core 111 by making use of the spaces of the slots to form the magnetic pole of the stator 101 by the concentrated winding method, a concentrated winding type motor involves a connection between its mechanism and each slot, making its processing difficult. Therefore, the connections are secured by forming it integral with a core insulator produced by resin molding, or by disposing the connections on coil ends.

The above means, however, increases a total amount of resin because of the resin molding, leading to a cooling failure or the like due to an increase in an oligomer that accumulates in a pipe or the like in a compressor employing a refrigerant. When the connections are disposed on the coil ends, the connections are unstable due to dispositions of windings and are difficult to secure, unlike the distributed winding type motor.

A concentrated winding type brushless DC motor in accordance with the present invention wherein lead connections of a drive coil and neutral points are efficiently disposed when forming a magnetic pole of a stator will be described with reference to the accompanying drawings.

FIG. 26 is an enlarged view of a part of a stator core. The stator core is provided with a tooth 512. The tooth 512 has a predetermined tooth width and is provided on its both sides with tooth distal end portions 513 along a surface of a rotor. Slot insulating paper 505 is disposed on an inner edge of the slot, and a drive coil 503 is directly wound around the tooth 512 by making use of a space of the slot.

To wind the drive coil, the drive coil 503 is retained at a distal end of a winding nozzle, and wound around the tooth 512 by needling of the nozzle. At this time, a space for securing the needling operation of the winding nozzle is formed between adjacent drive coils. Hollow connection insulating paper 506 is disposed in the space, and a lead connection 504 and a neutral point of the drive coil are buried and disposed in the paper.

Similarly, for every magnetic pole, the lead connections and the neutral points of the drive coils are buried and disposed in the slots by utilizing the spaces of the slots of the stator core, thus constructing the stator of the concentrated winding type brushless DC motor that reduces a bulk of a coil.

As set forth above, according to the present invention, the stator of a brushless DC motor can be made smaller, a concentrated winding type brushless DC motor can be achieved that is capable of reducing the bulk of a coil by efficiently disposing and burying a lead connection and a neutral point of a drive coil in a slot by utilizing a space secured for the needling operation of a winding nozzle for winding the drive coil when forming a magnetic pole of a stator, without securing a connection by making it integral with a core insulator formed by resin molding or by disposing it on a coil end as in a prior art.

Referring now to FIG. 27, a concentrated winding type brushless DC motor according to a tenth embodiment will be described.

The conventional concentrated winding type brushless DC motor is formed as illustrated in FIG. 11 and FIG. 12 as set forth above. The rotor 102 is inserted in the center of the stator 101 formed as described above to construct the concentrated winding type brushless DC motor. This enables the stator to be made smaller than a stator of a distributed winding type brushless DC motor. When directly winding the drive coil around the tooth 112 of the stator core 111 by making use of the spaces of the slots to form the magnetic pole of the stator 101 by the concentrated winding method, the concentrated winding type motor has higher winding tension because of its mechanism, and a force is applied to an end surface of the stator. Hence, a core insulator formed by resin molding is employed.

The above means, however, increases a total amount of resin because of the resin molding, leading to a cooling failure or the like due to an increase in an oligomer that accumulates in a pipe or the like in a compressor employing a refrigerant. Furthermore, there has been a danger in that a resin molding may be damaged due to a high winding tension.

A concentrated winding type brushless DC motor according to the present invention that overcomes the shortcoming of the prior art will be described. The brushless DC motor reduces stress applied by a coil to slot insulating paper when winding a drive coil around a tooth of a stator core.

Figure 27A:
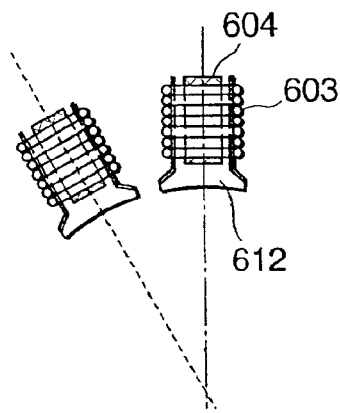
FIGS. 27A and 27B show wound coils using spacers in accordance with a tenth embodiment.
Figure 27B:
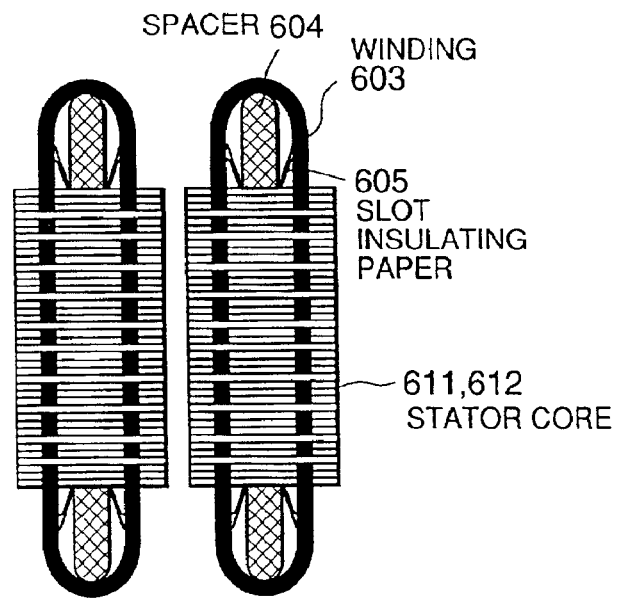
Figure 28A:
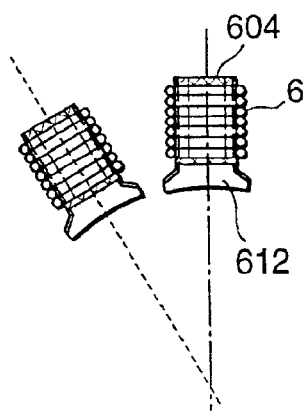
FIGS. 28A and 28B show wound coils using spacers in accordance with an eleventh embodiment.

FIG. 27A is a schematic top plan view focused on only two teeth of a stator core 611 of a stator shown in FIG. 28A. FIG. 27B is a front view of the two teeth of the stator core 611 as observed from an inner side of the stator core. In the drawings, reference numeral 603 denotes a drive coil or a winding, reference numeral 604 denotes a spacer, and reference numeral 605 denotes slot insulating paper.

The stator core 611 is provided with a tooth 612. The tooth 612 has a predetermined tooth width and is provided with tooth distal end portions on its both sides along a surface of a rotor. The slot insulating paper 605 is disposed on an inner edge of a slot, and the drive coil 603 is directly wound around the tooth 612, making use of spaces of slots.

When winding the drive coil 603, because of a mechanism of a concentrated winding type motor, a high winding tension is generated, and a force is applied to an end surface of the stator. When regular slot insulating paper is used, the insulating paper falls or bent inward. To prevent this, the spacer 604 is provided between an end surface of the stator tooth 612 and the coil 603 when winding the coil 603. Upon completion of winding the coil 603, the spacer 604 is removed, thus forming a magnetic pole of the stator.

Figure 28B:
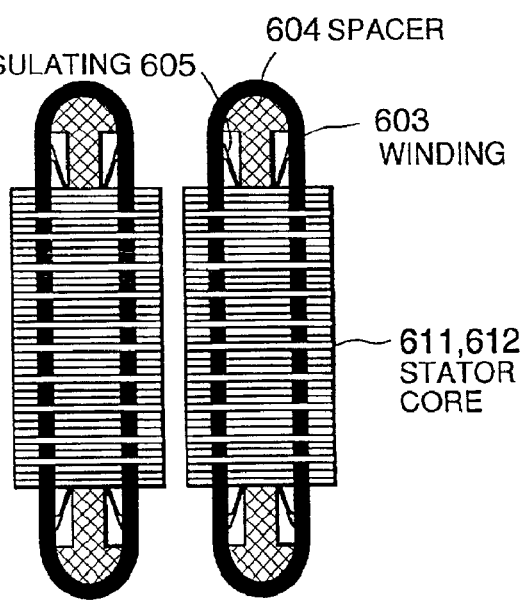

Referring to FIG. 28, an eleventh embodiment in accordance with the present invention will be described. FIG. 28A is a schematic top plan view focused on only two teeth of the stator core 611 of the stator. FIG. 28B is a front view of the two teeth of the stator core 611 as observed from an inner side of the stator core. In the drawings, like components as those shown in FIG. 27 will be assigned like reference numerals. The embodiment shown in FIG. 28 is different from the embodiment shown in FIG. 27 in that the spacer 604 formed to have a desired shape of a coil end is provided between the end surface of the stator tooth 612 and the coil 603.

Winding the coil 603 via the spacer 604 permits winding without applying winding tension to the slot insulating paper 605 while forming a desired gently curved shape on the coil end. This arrangement makes it possible to prevent the regular slot insulating paper 605 from falling or bending inward.

Thus, according to the present invention, a stator of a brushless DC motor can be made smaller, and winding a coil via a spacer provided at the end surface of a stator tooth permits a coil to be wound without winding tension being applied to insulating paper. Hence, a concentrated winding type brushless DC motor can be achieved that is capable of preventing regular slot insulating paper from falling or bending inward without the need for using a special insulator formed by resin molding.

Referring now to FIG. 29, a concentrated winding type brushless DC motor according to a twelfth embodiment will be described.

The conventional concentrated winding type brushless DC motor is formed as illustrated in FIG. 11 and FIG. 12 as set forth above. The rotor 102 is inserted in the center of the stator 101 formed as described above to construct the concentrated winding type brushless DC motor. This enables the stator to be made smaller than a stator of a distributed winding type brushless DC motor. When directly winding the drive coil around the tooth 112 of the stator core 111 by making use of the spaces of the slots to form the magnetic pole of the stator 101 by the concentrated winding method, the concentrated winding type motor has higher winding tension because of its mechanism, and a force is applied to an end surface of the stator. Hence, a core insulator formed by resin molding is employed.

The above means, however, increases a total amount of resin because of the resin molding, leading to a cooling failure or the like due to an increase in an oligomer that accumulates in a pipe or the like in a compressor employing a refrigerant. Furthermore, there has been a danger in that a resin molding may be damaged due to a high winding tension.

Descriptions will now be given to a concentrated winding type brushless DC motor in accordance with the present invention that allows regular slot insulating paper to be used without a danger of damaging the insulating paper under stress applied by a drive coil when the coil is wound around a tooth of a stator core.

Figure 29A:
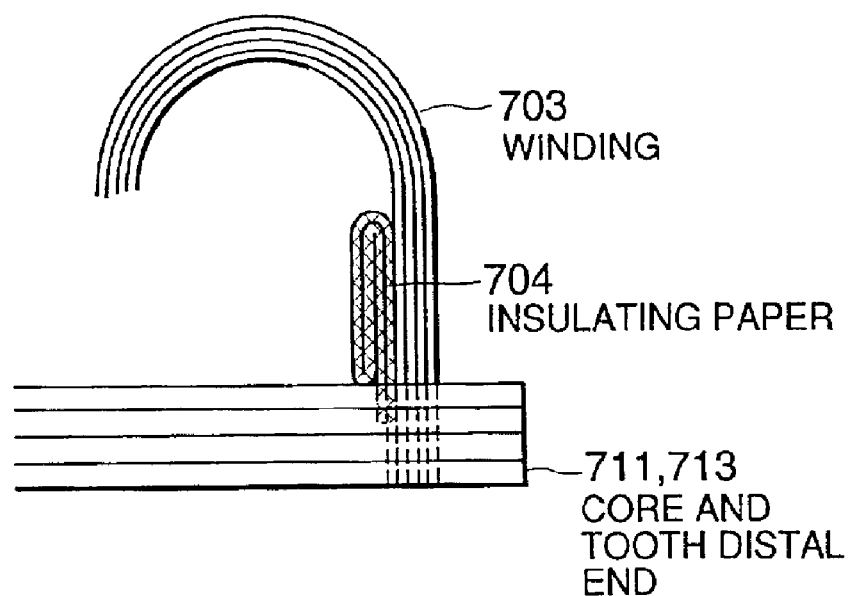
FIGS. 29A and 29B provide state diagrams of slot insulating paper in accordance with a twelfth and a thirteenth embodiment.

FIG. 29A is a schematic front view focused on only a single tooth of a stator core 711, and observed from an inner diameter side of a stator. In the drawing, reference numeral 703 denotes a drive coil or a winding, and reference numeral 704 denotes slot insulating paper.

A tooth of the stator core 711 has a predetermined tooth width and is provided with tooth distal end portions 713 on its both sides along a surface of a rotor. The slot insulating paper 704 is disposed on an inner edge of a slot, and the drive coil 703 is directly wound around the tooth of the stator, making use of spaces of slots.

When winding the drive coil 703, because of a mechanism of a concentrated winding type motor, tension of the winding is high, and a force is applied to an end surface of the stator. When regular slot insulating paper is used, the insulating paper falls or bent inward, leading to a motor failure attributable to damage to the insulating paper taking place at the end surface of the stator tooth.

In order to prevent such a fall or bend, plate-shaped slot insulating paper 704 of 0.2 mm to 0.5 mm is disposed on an inner edge of a slot of the stator core 711, and a portion of the insulating paper 704 that projects from an end surface of the stator is folded a plural number of times toward the tooth of the stator and welded by heating.

Thus, the slot insulating paper 704 that has been reinforced by being folded a plural number of times toward a tooth of the stator and welded by heating is provided between the end surface of the stator tooth and the coil 703 when winding the drive coil 703 around a tooth of the stator core 711. This arrangement makes it possible to prevent the slot insulating paper 704 from slipping out, and a motor failure attributable to damage to the insulating paper 704 occurring at the end surface of a stator tooth can be prevented.

Figure 29B:
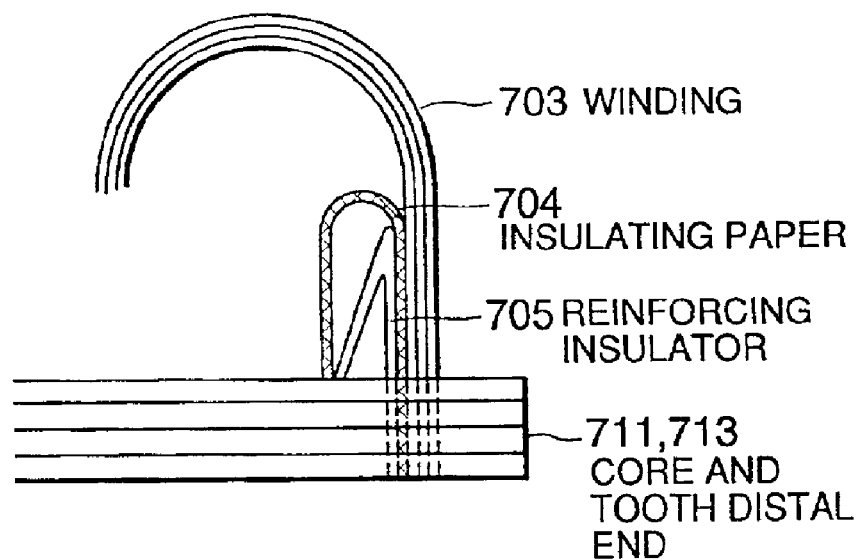

Referring now to FIG. 29B, a thirteenth embodiment in accordance with the present invention will be described. FIG. 29B is a schematic front view focused on only a single tooth of a stator core 711, and observed from an inner diameter side of a stator. In the drawing, reference numeral 703 denotes a drive coil or a winding, reference numeral 704 denotes slot insulating paper, and reference numeral 705 denotes a reinforcing insulator.

Plate-like slot insulating paper 704 of 0.2 mm to 0.5 mm is disposed on an inner edge of a slot of the stator core 711, a portion of the insulating paper 704 that projects from an end surface of the stator is folded back into a U shape toward a tooth of the stator, and the reinforcing insulator 705 that is formed substantially into a substantially inverse-V shape is provided between the end surface of the stator and the insulating paper 704.

Thus, the insulating paper 704 is folded back toward the tooth of the stator between the end surface of the stator tooth and the coil 703, and the reinforcing insulator 705 is provided between the end surface of the stator and the insulating paper 704 when winding the drive coil 703 around a tooth of the stator core 711. This arrangement makes it possible to prevent the slot insulating paper 704 from slipping out, and a motor failure attributable to damage to the insulating paper 704 occurring at the end surface of a stator tooth can be prevented.

As described above, according to the present invention, a stator of a brushless DC motor can be made smaller. Moreover, when winding a drive coil around a tooth of a stator core, the slot insulating paper that has been reinforced by being folded a plural number of times toward a tooth of the stator and welded by heating is provided between the end surface of the stator tooth and the coil, or insulating paper that is folded toward a tooth of the stator and a reinforcing insulator is provided between the end surface of the stator and the insulating paper. This arrangement makes it possible to prevent the slot insulating paper from slipping out, and a motor failure attributable to damage to the insulating paper occurring at the end surface of a stator tooth can be prevented.

In addition, regular slot insulating paper can be prevented from falling or bending inward without the need for using a special insulator formed by resin molding, thus permitting a safe concentrated winding type brushless DC motor to be accomplished.

Figure 30A:
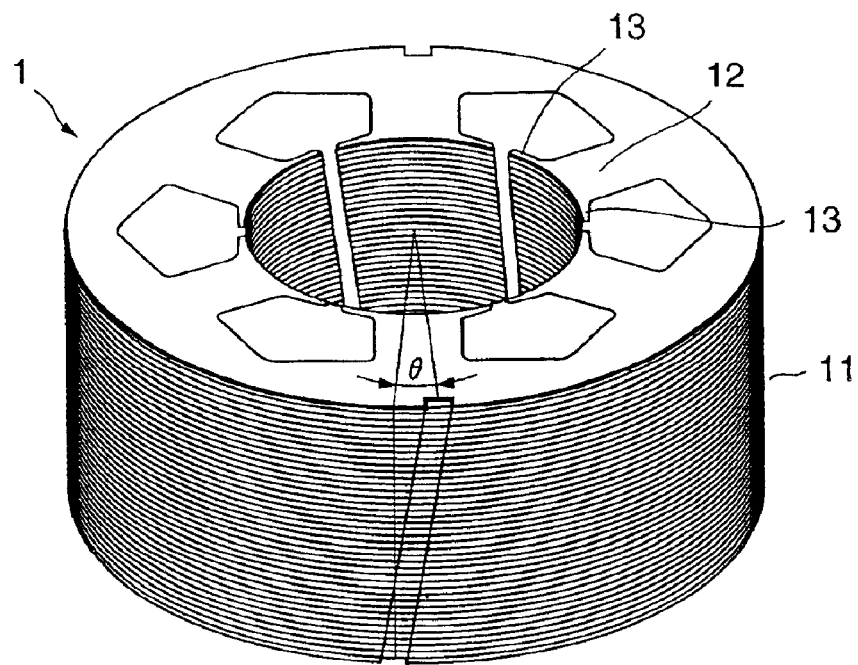
FIGS. 30A and 30B provide perspective views of a stator and a rotor in accordance with a fourteenth embodiment provided with skew.
Figure 30B:
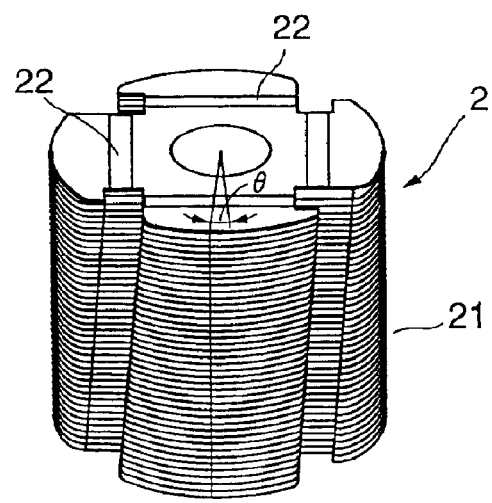
Figure 31:
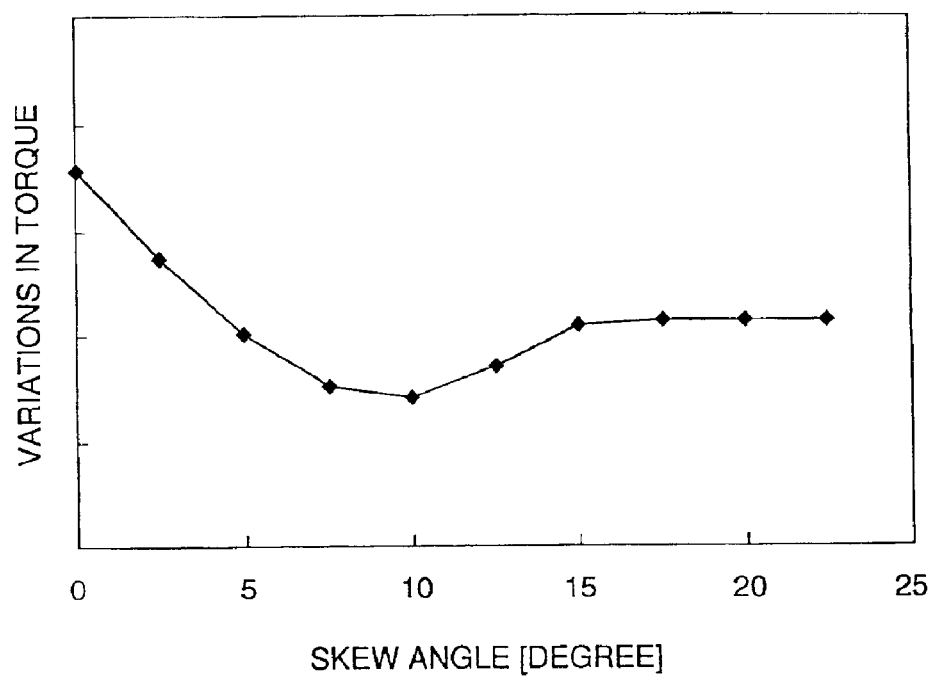
FIG. 31 is a characteristic diagram illustrative of a relationship between variations in torque and skew angle.

Referring now to FIG. 30 and FIG. 31, a concentrated winding type brushless DC motor according to a fourteenth embodiment will be described.

The conventional concentrated winding type brushless DC motor is formed as illustrated in FIG. 11 and FIG. 12 as set forth above. The rotor 102 is inserted in the center of the stator 101 formed as described above to construct the concentrated winding type brushless DC motor. This enables the stator to be made smaller than a stator of a distributed winding type brushless DC motor. However, the concentrated winding type brushless DC motor having the above construction is not capable of completely eliminating variations in torque and resultant noises, and some variations in torque and the consequent noises have to be accepted as part of the characteristics of the motor.

Descriptions will now be given of a concentrated winding type brushless DC motor in accordance with the present invention that has reduced variations in torque and the resultant noises by analyzing a structure and characteristics of a motor.

According to the present invention, an analysis of the structure and characteristics of the motor has been performed, paying attention to the fact that variations in torque and the consequent noises can be reduced also in a concentrated winding type brushless DC motor by individually providing a stator or a rotor or by providing both the stator and the rotor with skews, as in the case of providing a rotor of an AC motor with a skew.

Analysis results have revealed a relationship between skew angles and variations in torque shown in FIG. 31. It has been found that variations in torque can be reduced to a minimum value by setting the skew angle φ to 7.5±5 degrees. It has been also verified that variations in torque can be reduced by individually providing the stator or the rotor with a skew or by providing both the stator and the rotor with skews.

The fourteenth embodiment of the concentrated winding type brushless DC motor in accordance with the present invention will be described in conjunction with the accompanying drawings. In FIG. 30, like components as those shown in FIG. 11 and FIG. 12 are assigned like reference numerals. FIG. 30A shows a case where the skew has been applied to a stator as an embodiment of the present invention. A stator core 11 is provided a skew, the skew angle φ being set to 7.5±5 degrees in relation to a shaft of the stator.

FIG. 30B shows a case where the skew has been applied to a rotor as a fifteenth embodiment of the present invention. In recent years, a magnet which is inserted in a rotor and which can be deformed so as to be inserted in a hole is available. The skew is provided on a rotor core 21, the skew angle φ being set to 7.5±5 degrees in relation to a shaft of the stator.

Although not shown, skews may be provided on both the stator and the rotor as a sixteenth embodiment of the present invention. In this case, the skew angles φ of the stator core 11 and the rotor core 21 are set so that a relative angle is 7.5±5 degrees.

Thus, according to the present invention, a stator of a brushless DC motor can be made smaller. Moreover, a concentrated winding type brushless DC motor that exhibits less variations in torque and less resultant noises can be achieved by individually providing a stator or a rotor with a skew or by providing both the stator and the rotor with skews by analyzing a structure and characteristics of the motor.

Figure 32:
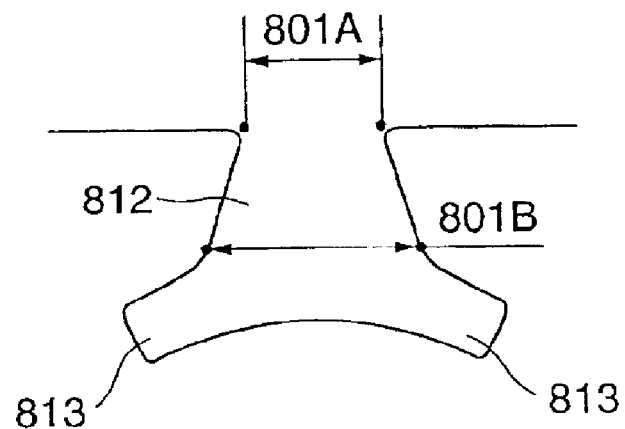
FIG. 32 is a top plan view showing a tooth shape of a stator core in accordance with a seventeenth embodiment.

Referring now to FIG. 32, a concentrated winding type brushless DC motor according to a seventeenth embodiment will be described.

The conventional concentrated winding type brushless DC motor is formed as illustrated in FIG. 11 and FIG. 12 as set forth above. The rotor 102 is inserted in the center of the stator 101 formed as described above to construct the concentrated winding type brushless DC motor. This enables the stator to be made smaller than a stator of a distributed winding type brushless DC motor.

Figure 33:
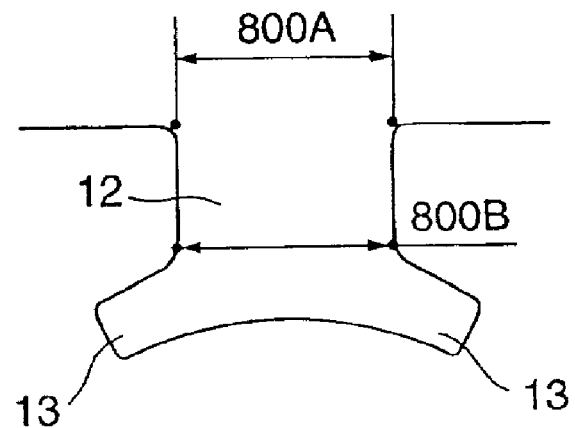
FIG. 33 is a top plan view showing a tooth shape of a conventional stator core.

A drive coil is directly wound around a tooth 112 of a stator core 111 by utilizing spaces of slots to form a magnetic pole of the stator 101 by the concentrated winding method. At this time, since a high winding tension is generated due to a mechanism of the concentrated winding type motor, a coil bundle on a coil end tends to bulge out to an inner diameter side of the stator in the conventional stator tooth having a shape as shown in FIG. 33 because a width 800A of a slot bottom and a width 800B of an inner diameter side portion of the stator are the same. To prevent this, coercive reshaping is performed. This has been requiring an extra operation step and also responsible for deteriorated quality.

Referring to the accompanying drawings, a concentrated winding type brushless DC motor in accordance with the present invention in which a coil bundle on a coil end does not bulge out to the inner diameter side of the stator due to stress applied by the coil when winding a drive coil around a tooth the stator core.

FIG. 32 is a schematic top plan view with a focus placed only one a single tooth of the stator core of the stator. Reference numeral 813 denotes tooth distal end portions extending on both sides of a tooth 812.

In the present invention, the tooth 812 of the stator core is shaped so that a width 801B of the stator inner diameter side portion is larger than a width 801A of a slot bottom. Thus, the tooth 812 is formed into a fan shape, diverging toward the inner diameter side of the stator. This causes a wound coil of a lower layer to move toward the slot bottom. The remaining teeth 812 of the stator core are formed in the same manner.

With this arrangement, when winding a drive coil around a tooth of a stator core, no excessive stress is applied to a coil, preventing a bundle of coil on a coil end from bulging out to the stator inner diameter side, thus enabling quality to be maintained. Moreover, coercive reshaping for preventing such bulging is no longer necessary, permitting the reshaping operation step to be obviated.

Thus, according to the present invention, a stator of a brushless DC motor can be made smaller, and a bundle of coil on a coil end can be prevented from bulging out to the stator inner diameter side when winding a drive coil around a tooth of a stator core, making it possible to maintain quality. In addition, the coercive reshaping for preventing a bundle of coil from bulging out is obviated, so that an operation step for the coercive reshaping can be omitted.

A concentrated winding type brushless DC motor according to an eighteenth embodiment will now be described with reference to FIG. 32.

The conventional concentrated winding type brushless DC motor is formed as illustrated in FIG. 11 as set forth above. The rotor 102 is inserted in the center of the stator 101 formed as described above to construct the concentrated winding type brushless DC motor. This enables the stator to be made smaller than a stator of a distributed winding type brushless DC motor. However, the concentrated winding type brushless DC motor having the above construction is not capable of completely eliminating variations in torque and resultant noises, and some variations in torque and the consequent noises have to be accepted as part of the characteristics of the motor.

Especially because a conventional rotor (in a thickness or laminating direction) is punched (automatically caulked) in a predetermined direction, an entire outer peripheral portion of a rotor core shares the same configuration relative to the core laminating direction. This has been partly responsible for variations in torque and the resultant vibrations or noises.

Skew effect adopted for a typical induction motor can be a solution to the problem of the vibrations and noises. However, in the case of the concentrated winding type brushless DC motor to which the invention is applied, the rotor has a buried magnet; hence, it is not easy to provide the rotor with a skew. In order to obtain the skew effect, the skew has to be provided on a stator, requiring an additional step for manufacturing the stator and involving a danger of deterioration in manufacturing quality or the like.

Descriptions will now be given of a concentrated winding type brushless DC motor in accordance with the present invention that has reduced variations in torque and the consequent vibrations and noises by devising a structure of a rotor.

Figure 34A:
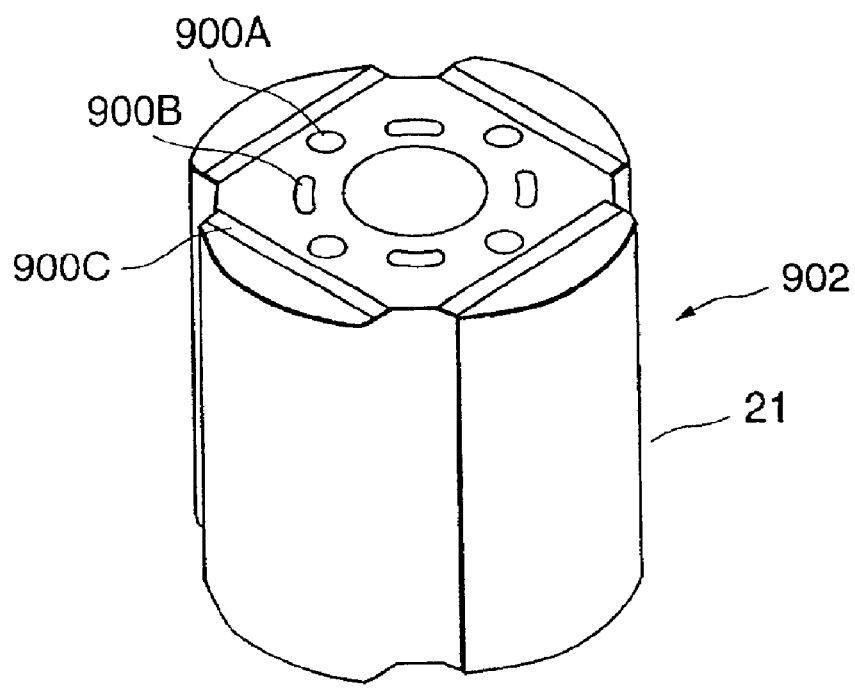
FIGS. 34A and 34B provide perspective views of a rotor having a different outer peripheral core cut shape in accordance with an eighteenth embodiment.
Figure 34B:
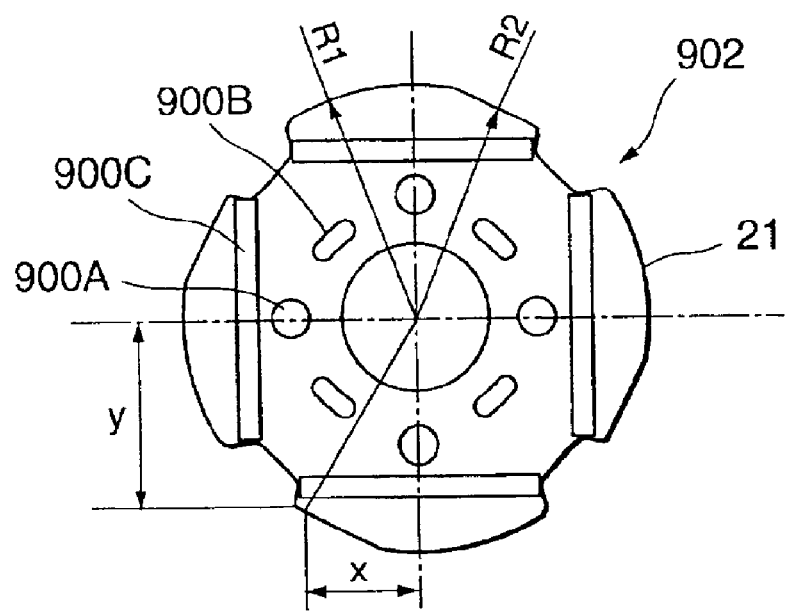

FIGS. 34A and 34B are a perspective view and a top plan view, respectively, of the rotor. In FIG. 34, reference numeral 900A denotes a riveting hole, reference numeral 900B denotes an air hole, and reference numeral 900C denotes a magnet inserting slot.

The rotor 902 employed in the present invention is characterized by a core cut configuration of an outer peripheral portion of the rotor 902. More specifically, referring to the top plan view of the rotor core of FIG. 34B, distances R1 and R2 from a center of the rotor 902 to the outer peripheral portion of the rotor 902 are different in relation to a core laminating direction. Therefore, coordinates of an arbitrary point on the outer peripheral portion that corresponds to the distance R2 take different values x and y from the center of the rotor 902.

Figure 35:
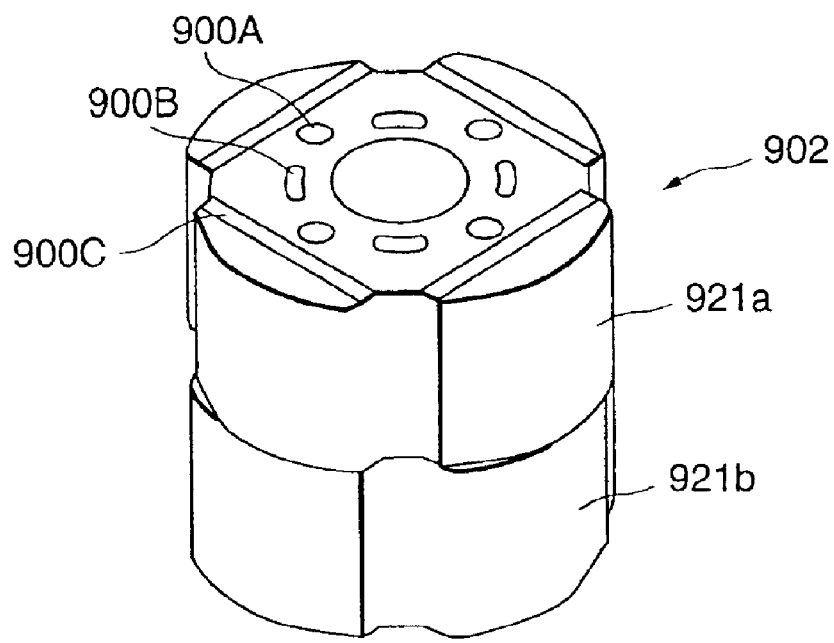
FIG. 35 is a perspective view of the rotor employed for the eighteenth embodiment.

If a laminate-formed core is used for the core having the shape shown in FIG. 34A, distribution of magnetic fluxes of a magnetic circuit in a stator core will be uneven rather than even, causing occurrence of fluctuation in torque with consequent noises. Hence, in the invention, a rotor core 921 is formed by stacking an upper portion 921a and a lower portion 921b in the laminating direction of the rotor core 921 in such a manner that they are staggered as shown in FIG. 35 so as to create irregular core cut configurations in the outer peripheral portion of the rotor 902. As a result, the core cut configurations of the outer peripheral portion of the rotor 902 can be varied in the core laminating direction.

Figure 37:
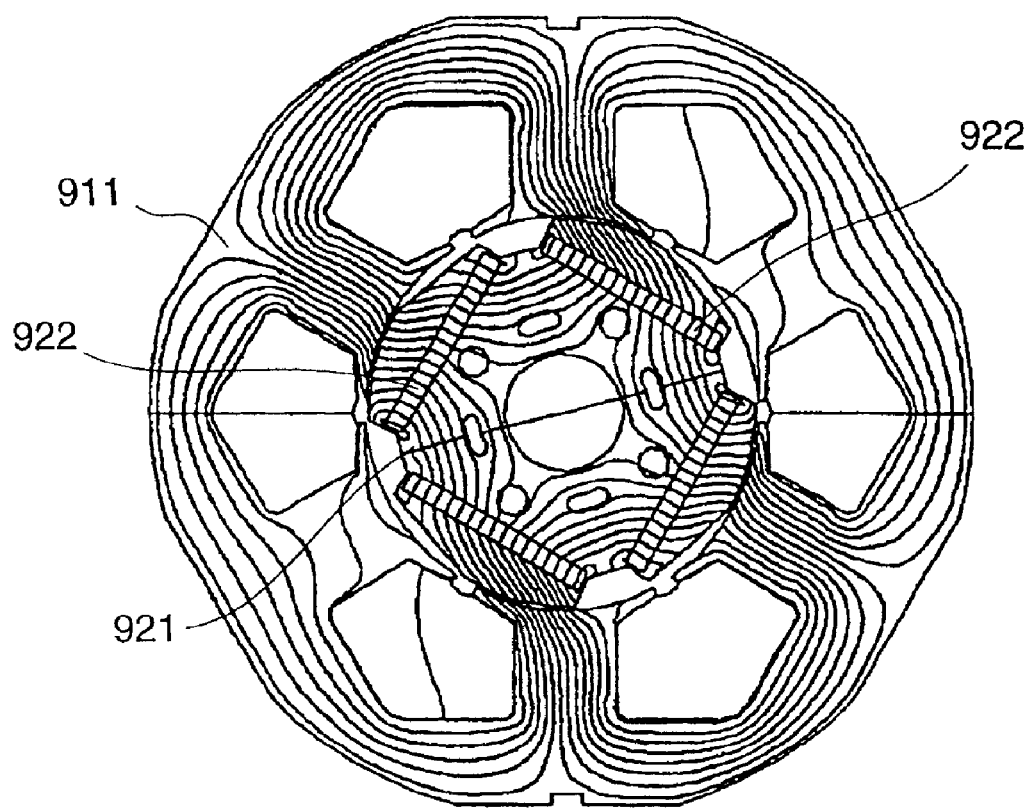
FIG. 37 is a magnetic circuit and magnetic flux distribution diagram of a stator core and a rotor core in accordance with the eighteenth embodiment.
Figure 38:
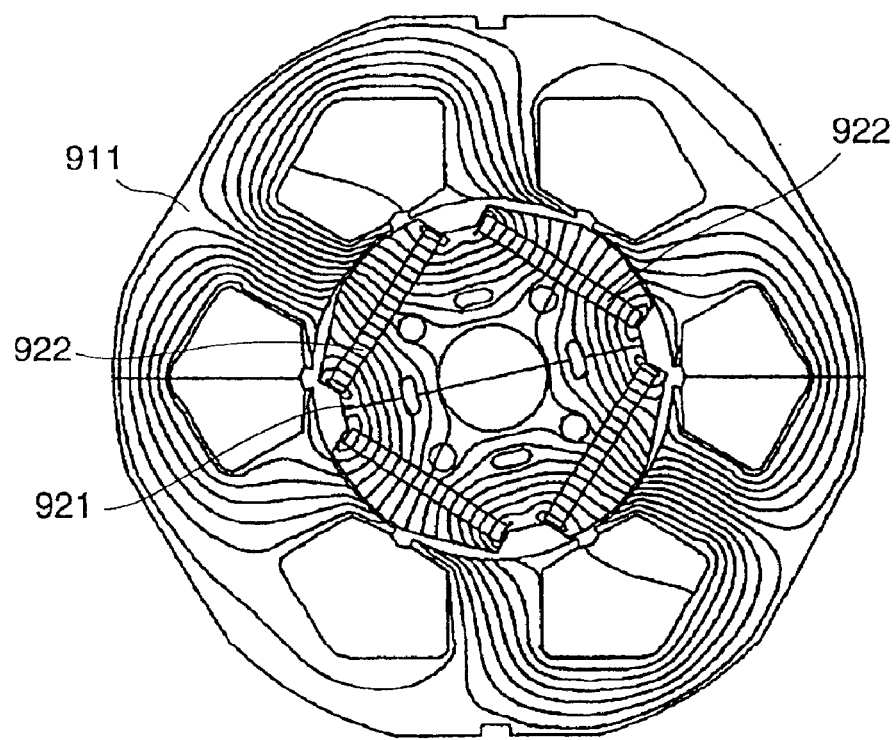
FIG. 38 is another magnetic circuit and magnetic flux distribution diagram of a stator core and a rotor core in accordance with the eighteenth embodiment.

As shown in FIG. 36, a permanent magnet 922 is inserted in the magnet inserting slot 900C of the rotor core to configure the rotor. The magnetic circuit and the distribution of magnetic fluxes based on a relationship between a stator core 911 the rotor core 921 are as shown in FIG. 37 and FIG. 38. More specifically, when the rotor rotates clockwise, FIG. 37 shows the distribution of magnetic fluxes in the upper portion 921a in the laminating direction of the stack of the rotor core 921, while FIG. 38 shows the distribution of magnetic fluxes in the lower portion 921b in the laminating direction of the stack of the rotor core 921. Hence, combining the distributed magnetic fluxes of these upper and lower portions to compensating each other will lessen uneven distribution as a whole. This means that the fluctuation in torque and the resultant occurrence of noises can be reduced.

Figure 36A:
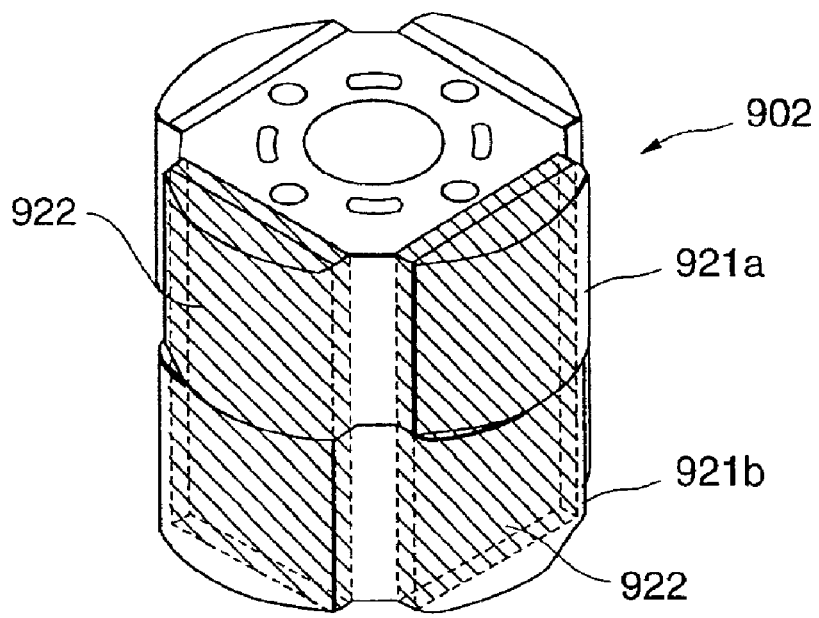
FIGS. 36A and 36B provide perspective views of rotors with magnets inserted therein of the eighteenth embodiment and a nineteenth embodiment.

As illustrated in FIG. 36, the permanent magnet 922 is inserted in the magnet inserting slot 900C of the rotor core to construct the rotor. In the case of the rotor shown in FIG. 36A, when the same magnet 922 is shared by the upper portion 921a and the lower portion 921b that are staggered in the stacking direction of the laminate of the rotor core 921 so that they have different outer peripheral configurations in the core stacking direction, a flow of the magnetic fluxes produced by the rotor can be changed by making the outer peripheral core cut configurations of the rotor different in the core stacking direction. With this arrangement, the same advantage as that obtained by providing a stator with a skew can be obtained, and the skew effect in the stacking direction can be obtained at portions having different outer peripheral configurations.

Figure 36B:
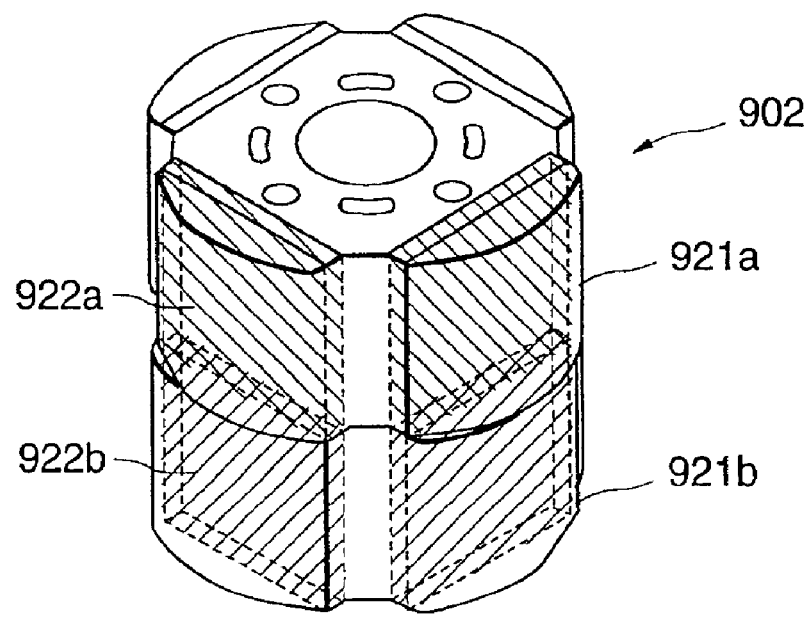

The rotor shown in FIG. 36B represents a nineteenth embodiment of the present invention, wherein separate magnets 922a and 922b are inserted in the upper portion 921a and the lower portion 921b, respectively, that are stacked in different stacking directions of the laminate of rotor core 921. With this arrangement, a flow of the magnetic fluxes produced by the rotor can be changed by making the outer peripheral core cut configurations of the rotor different in the core stacking direction. Moreover, the same advantage as that obtained by providing a stator with a skew can be obtained. In addition, the magnetic forces of the magnets in the upper portion 921a and the lower portion 921b can be changed, permitting selection of further ideal skew effect.

Figure 39:
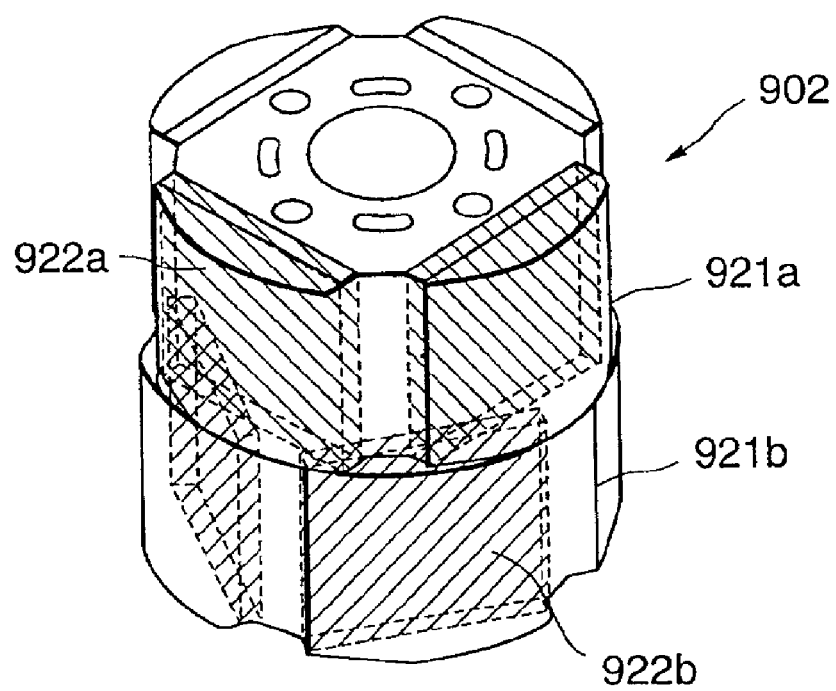
FIG. 39 is a perspective view of a rotor with a magnet inserted therein in accordance with a twentieth embodiment.

A twentieth embodiment of the present invention shown in FIG. 39 employs separate magnets 922a and 922b for the upper portion 921a and the lower portion 921b of the rotor core 921 that have different stacking orientations. Positions of the magnets 922a and 922b inserted in different outer peripheral configurations are radially shifted.

With this arrangement, a flow of the magnetic fluxes produced by the rotor can be changed by varying the outer peripheral core cut configurations of the rotor in the core stacking direction, and the same advantage as that obtained by providing a stator with a skew can be obtained. In addition, by shifting the inserting positions of the magnets inserted in the portions of the outer peripheral configurations that are different in the core stacking direction, the same skew effect can be obtained even when magnets of the same magnetic force are inserted. Moreover, use of magnets having different magnetic forces makes it possible to significantly vary an amount of the skew effect.

Thus, according to the present invention, a stator of a brushless DC motor can be made smaller. Moreover, a flow of the magnetic fluxes produced by the rotor can be changed by varying the outer peripheral core cut configurations of the rotor in the core stacking direction, and the same advantage as that obtained by providing a stator with a skew can be obtained. As a result, fluctuation in torque and the resultant noises can be reduced.

If the same magnet is shared and inserted in the portions having outer peripheral configurations that are different in the core stacking direction, then the skew effect can be obtained in relation to the stacking direction at the portions having the different outer peripheral configurations. If separate magnets are used, then the magnetic forces of the magnets can be changed, permitting selection of further ideal skew effect.

Furthermore, even when magnets of the same magnetic force are inserted, the same skew effect can be obtained by shifting the positions where the magnets are inserted in the portions having outer peripheral configurations that are different in the core stacking direction. By employing magnets of different magnetic forces, the amount of the skew effect can be considerably changed.

Descriptions will now be given of a concentrated winding type brushless DC motor according to a twenty-first embodiment with reference to FIG. 40.

The conventional concentrated winding type brushless DC motor is formed as illustrated in FIG. 11 and FIG. 12 as set forth above. The rotor 102 is inserted in the center of the stator 101 formed as described above to construct the concentrated winding type brushless DC motor. This enables the stator to be made smaller than a stator of a distributed winding type brushless DC motor. When a drive coil is directly wound around a tooth 112 of the stator core 111 by making use of the spaces of the slots to form a magnetic pole of the stator 101 by the concentrated winding method, plate-shaped slot insulating paper is disposed on an inner edge of the slot of the stator core as shown in FIG. 42.

Figure 42:
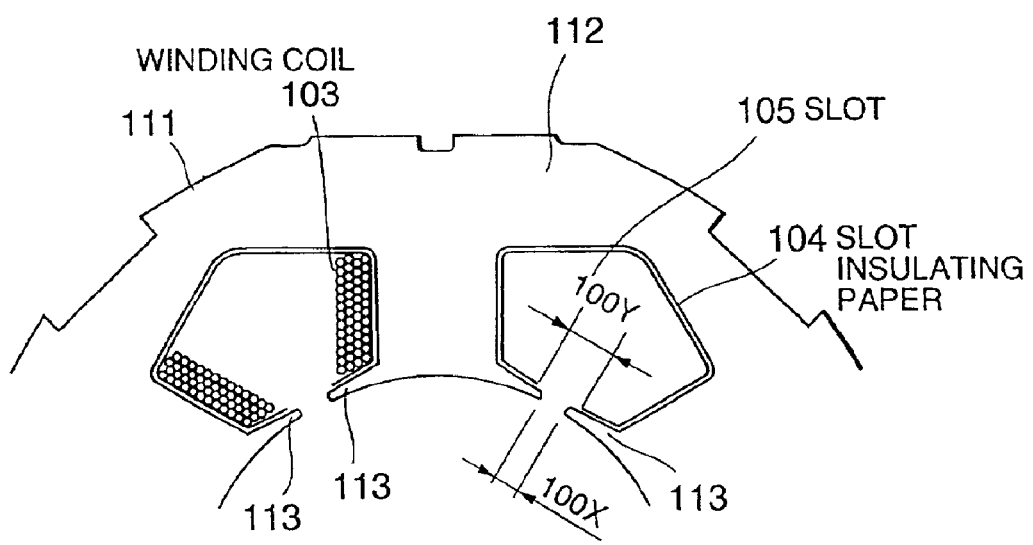
FIG. 42 shows a conventional slot insulating paper that has been installed.

FIG. 42 is a schematic front view focused on only a single tooth of a stator core 111 shown in FIG. 11A, and observed from an inner diameter side of a stator. In the drawing, reference numeral 103 denotes a drive coil or a winding, reference numeral 104 denotes slot insulating paper, and reference numeral 105 denotes a slot.

A tooth 112 of the stator core 111 has a predetermined tooth width and is provided with tooth distal end portions 113 on its both sides. The plate-like slot insulating paper 104 is disposed on an inner edge of the slot 105, and the drive coil 103 is directly wound around the tooth 112 of the stator, making use of spaces of slots 105. At this time, if an aperture width 100Y of an end surface of the insulating paper 104 opposing an aperture of the slot 105 is set to the same dimension as an aperture width 100X of the stator tooth distal end portions 113, then dielectric strength between the drive coil 103 and the tooth distal end portions 113 of the stator has not been entirely sufficient.

A concentrated winding type brushless DC motor in accordance with the present invention that overcomes the difficulty mentioned above will be described with reference to the accompanying drawings. The concentrated winding type brushless DC motor is capable of securing sufficiently high dielectric strength between the drive coil and the stator tooth distal end portions when standard slot insulating paper is used when winding the drive coil around a tooth of the stator core.

Figure 40:
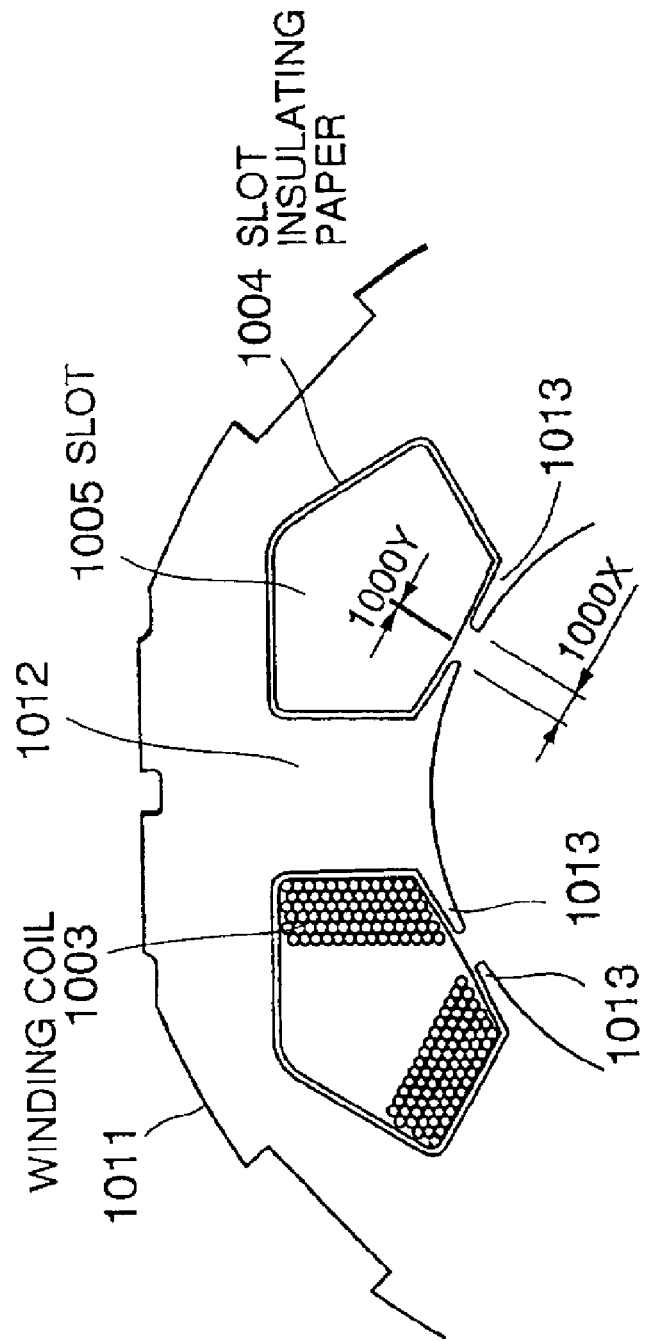
FIG. 40 shows installed slot insulating paper in accordance with a twenty-first embodiment.

FIG. 40 is a schematic front view focused on only tooth 1012 of a stator core 1011, and observed from an inner diameter side of a stator. In the drawing, reference numeral 1003 denotes a drive coil or a winding, reference numeral 1004 denotes slot insulating paper, and reference numeral 1005 denotes a slot.

A tooth of the stator core 1011 has a predetermined tooth width and is provided with tooth distal end portions 1013 on its both sides. The plate-like slot insulating paper 1004 of 0.2 mm to 0.5 mm is disposed on an inner edge of the slot 1005, and the drive coil 1003 is directly wound around the tooth 1012 of the stator, making use of spaces of slots 1005.

At this time, an aperture width 1000Y of an end surface of the insulating paper 1004 that opposes an aperture of the slot 1005 is set to be smaller than an aperture width 1000X of the tooth distal end portions 1013 of the stator. With this arrangement, the insulating paper 1004 becomes longer, while the aperture width 1000Y becomes smaller, so that a sufficient insulation distance can be maintained between the drive coil 1003 and the tooth distal end portions 1013 of the stator, permitting necessary dielectric strength to be secured.

Figure 41A:
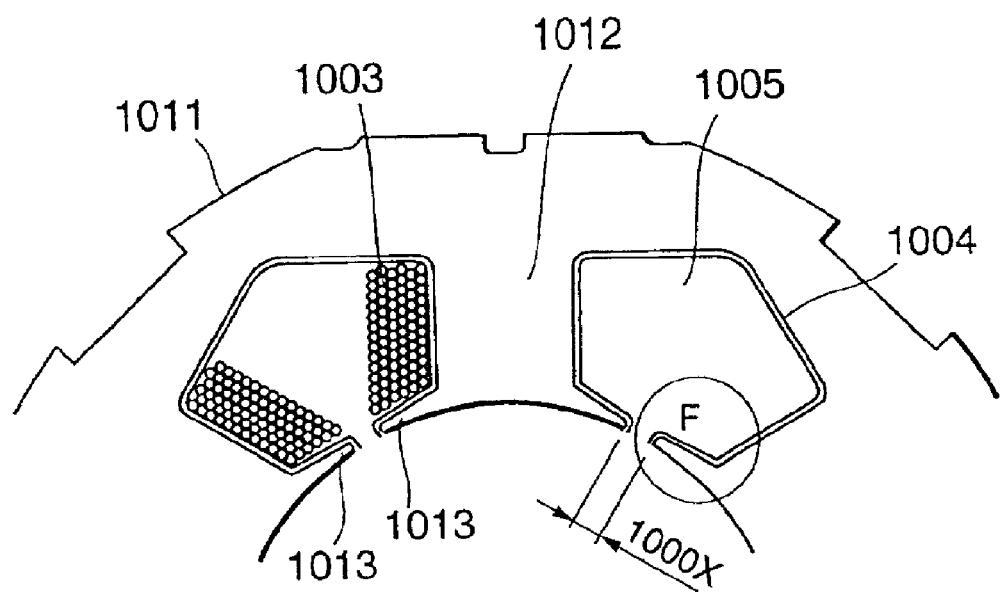
FIGS. 41A and 41B show installed slot insulating paper in accordance with a twenty-second embodiment.

Referring now to FIG. 41, a twenty-second embodiment of the present invention will be described. FIG. 41A is a schematic front view focused on only tooth 1012 of a stator core 1011, and observed from an inner diameter side of a stator. In the drawing, reference numeral 1003 denotes a drive coil or a winding, reference numeral 1004 denotes slot insulating paper, and reference numeral 1005 denotes a slot.

A tooth of the stator core 1011 has a predetermined tooth width and is provided with tooth distal end portions 1013 on its both sides. The plate-like slot insulating paper 1004 of 0.2 mm to 0.5 mm is disposed on an inner edge of the slot 1005, and the drive coil 1003 is directly wound around the tooth 1012 of the stator, making use of spaces of slots 1005.

Figure 41B:
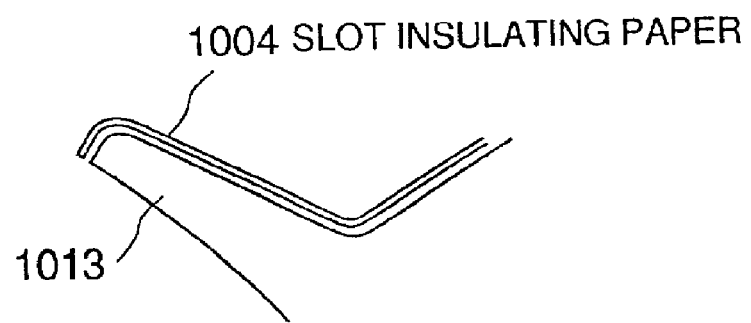

At this time, an end surface portion of the insulating paper 1004 that opposes an aperture of the slot 1005 is extended along the stator tooth distal end portions 1013 of the aperture of the slot 1005. FIG. 41B is an enlarged view of a circled portion F of FIG. 41A.

As is obvious from the drawing, the end surface portion of the insulating paper 1004 is extended along the stator tooth distal end portion 1013 of the aperture of the slot 1005. With this arrangement, the insulating paper 1004 becomes longer, so that a sufficient insulation distance can be maintained between the drive coil 1003 and the tooth distal end portions 1013 of the stator, permitting necessary dielectric strength to be secured.

Thus, according to the present invention, a stator of a brushless DC motor can be made smaller, and slot insulating paper can be made longer even if no wedges are placed in coil spaces of slots after a drive coil is wound around a tooth of a stator core. Hence, an adequate insulation distance can be maintained between the drive coil and stator tooth distal end portions, and necessary dielectric strength can be secured.

A concentrated winding type brushless DC motor according to a twenty-third embodiment will now be described with reference to FIG. 43 and FIG. 44.

The conventional concentrated winding type brushless DC motor is formed as illustrated in FIG. 11 and FIG. 12 as set forth above. The rotor 102 is inserted in the center of the stator 101 formed as described above to construct the concentrated winding type brushless DC motor. When a drive coil (not shown) is directly wound around a tooth 112 of the stator core 111 by making use of the spaces of the slots 114 to form a magnetic pole of the stator 101 by the concentrated winding method, increasing coil occupancy by performing aligned winding without waste down to a root of the tooth 112 of the stator core 111 allows the efficiency of the motor to be increased accordingly.

Mainly from a viewpoint of cost, a ready-made winding machine is usually used for winding a coil around a tooth of a stator; however, an operational range of a nozzle of the winding machine has been limited. Therefore, in the concentrated winding method in which a drive coil is directly wound around the tooth 112 of the stator core 111 by making use of spaces of the slots 114, it has been impossible to perform aligned winding without waste down to a root of the tooth 112 of the stator core 111.

In order to accomplish the aligned winding down to the root of the tooth 112 of the stator core 111, the slot 114 could be made deeper so as to allow the nozzle of the winding machine to reach an upper level. This, however, would make a magnetic path of the stator narrower, which is not desirable from the standpoint of the motor efficiency. Hence, the measures of making the slot 114 deeper has limitation.

A concentrated winding type brushless DC motor in accordance with the present invention that has overcome the aforesaid difficulty will be described with reference to the accompanying drawings. In the concentrated winding type brushless DC motor, the slots of a stator are formed to enable a drive coil to be wound in alignment without waste down to a root of a tooth of a stator core when forming a magnetic pole of the stator.

Figure 43:
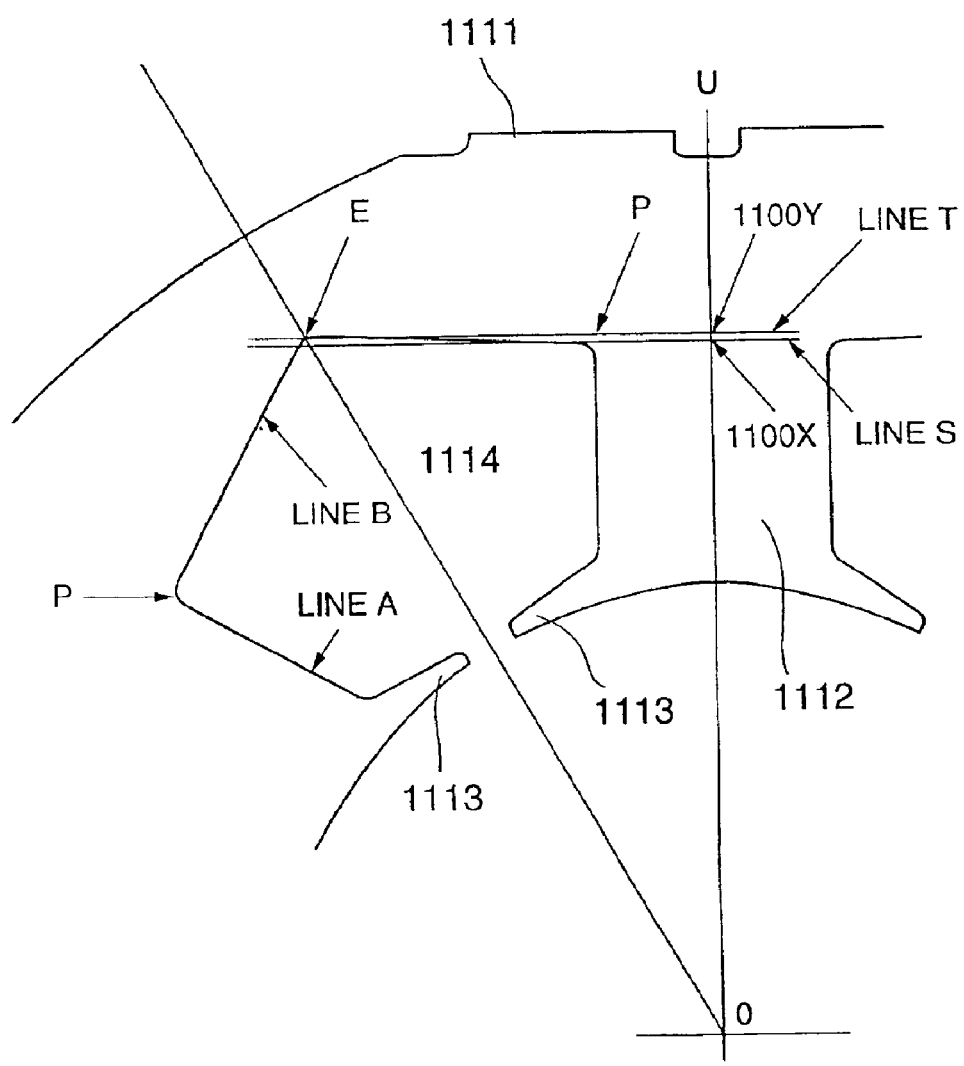
FIG. 43 is an enlarged view of a part of a stator core in accordance with a twenty-third embodiment.
Figure 44:
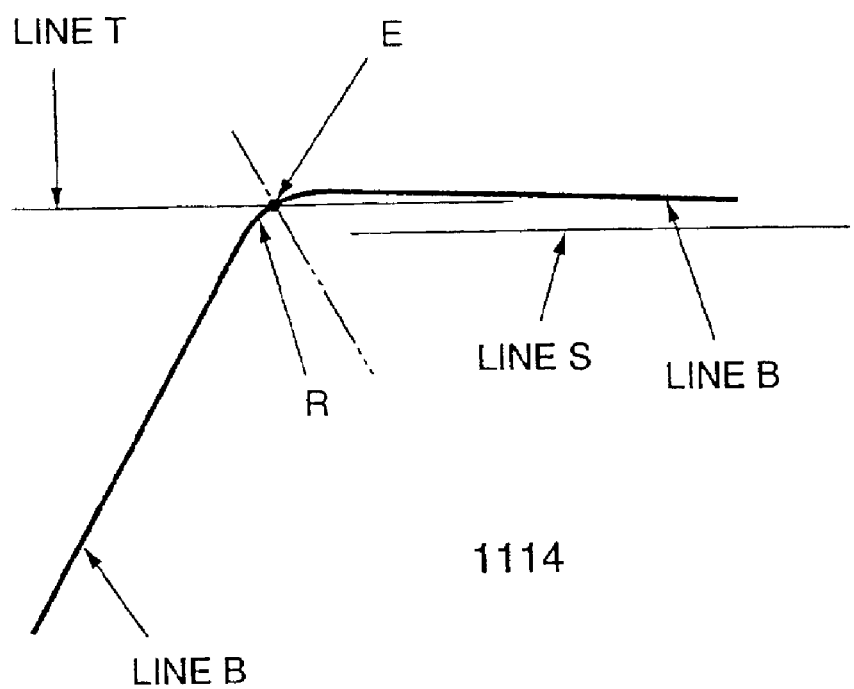
FIG. 44 is an enlarged view of a part of a slot in accordance with the twenty-third embodiment.

FIG. 43 is an enlarged view of a part of a stator core 1111, and FIG. 44 is an enlarged view of a bottom portion of a slot 1114. The present invention has been made based on finding from an experiment and analysis that forming slots according to the following method allows a drive coil to be wound in alignment without waste down to a root of a tooth of a stator core.

In the explanation, an intersection at which a straight line extending from a center of the stator and passing a center of a tooth intersects with a perpendicular S that extends from an intersection P of a line A and a line B of the slot 1114 is denoted as 1100X; and an intersection at which a line T, which passes an intersection E of the line extending from the center of the stator and the line B passing R (see FIG. 44) of the bottom of the slot 1114 and which is parallel to the line S, intersects with the straight line extending from the center of the stator and passing the center of the tooth is denoted as 1100Y. When the line S is taken as a reference, the position or distance of the line T, that is, a distance between the intersection 1100X and the intersection 1100Y is set to a range from −2 mm to +5 mm, where "−" means the inner diameter side of the stator.

Accordingly, in the present invention, the intersection P and the intersection E of the slot are set to satisfy the above conditions. This allows a drive coil to be wound in alignment without waste down to a root of the tooth 1112 of the stator core 1111 when forming a magnetic pole of the stator by using a ready-made winding machine having a nozzle with a limited operation range.

Thus, according to the present invention, a stator of a brushless DC motor can be made smaller, and a drive coil can be wound in alignment without waste down to a root of a tooth of a stator core when forming a magnetic pole of the stator by the concentrated winding method in which the drive coil is directly wound around the tooth of the stator core by making use of spaces of slots. As a result, coil occupancy is increased, enabling a concentrated winding type brushless DC motor with higher motor efficiency to be achieved.

Figure 45:
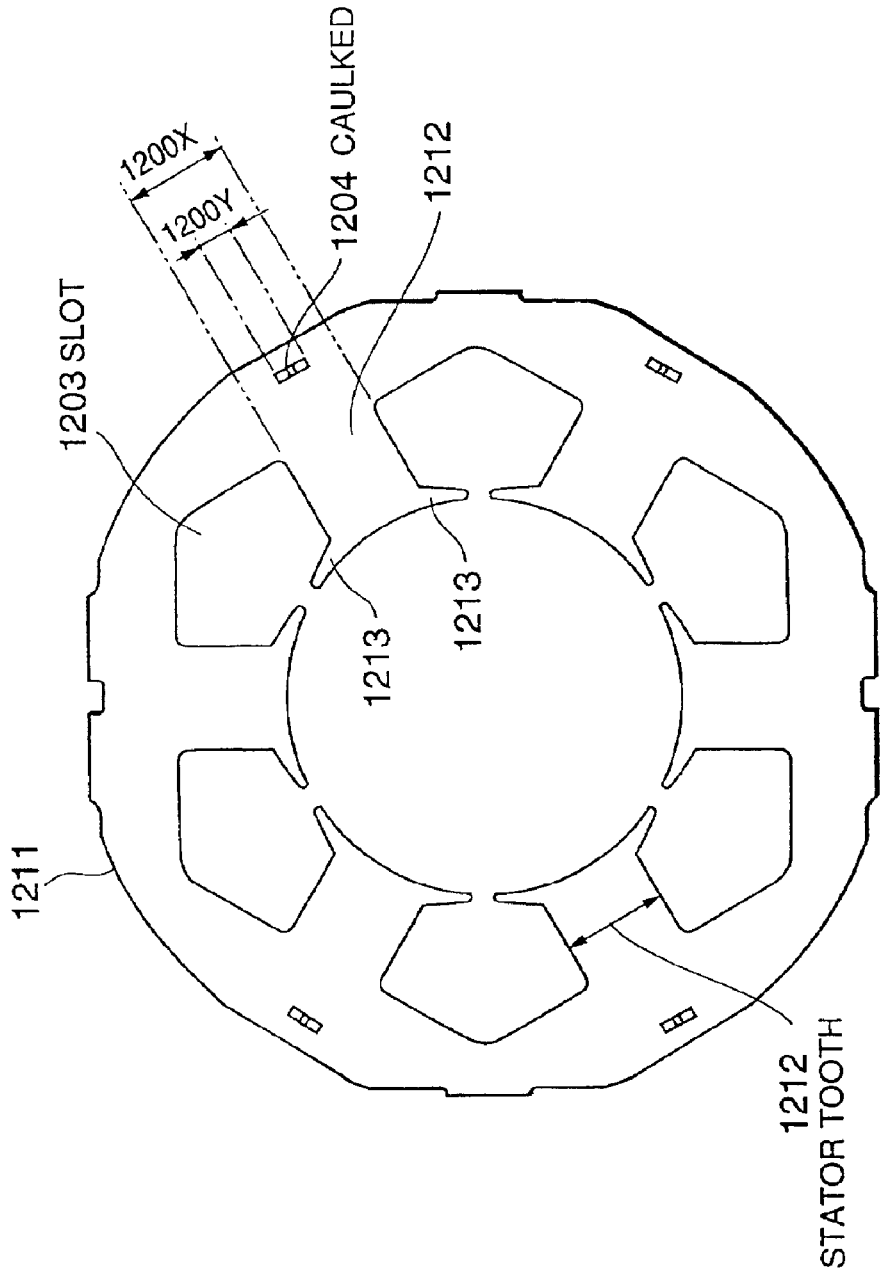
FIG. 45 is a top plan view of a stator core in accordance with a twenty-fourth embodiment.
Figure 46:
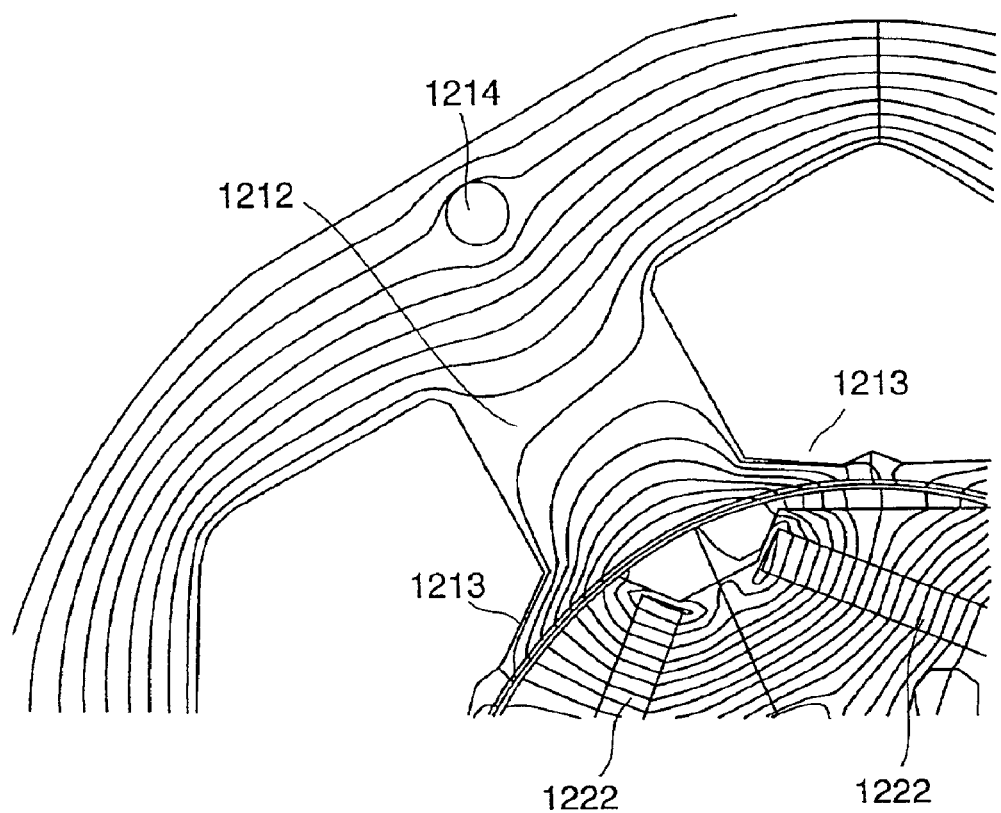
FIG. 46 is a state diagram showing magnetic flux distribution of a stator and a rotor.
Figure 47:
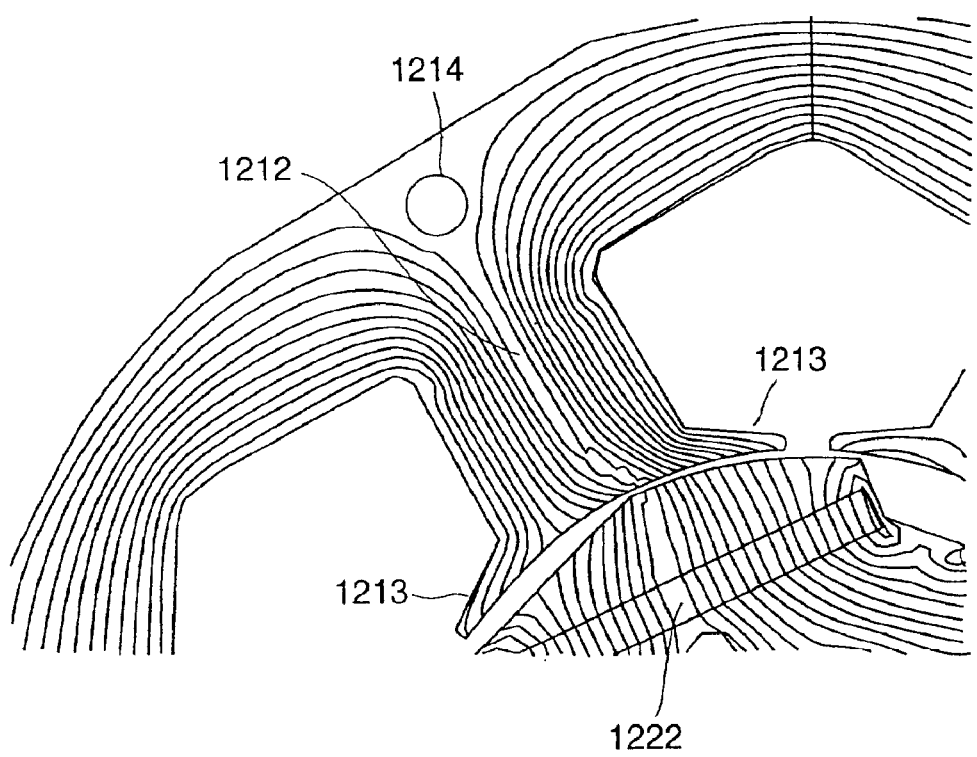
FIG. 47 is another state diagram showing magnetic flux distribution of the stator and the rotor.

Referring now to FIG. 45 through FIG. 47, a concentrated winding type brushless DC motor according to a twenty-fourth embodiment will be described.

The conventional concentrated winding type brushless DC motor is formed as illustrated in FIG. 11 and FIG. 12 as set forth above. The rotor 102 is inserted in the center of the stator 101 formed as described above to construct the concentrated winding type brushless DC motor. Stacked stator cores of the concentrated winding type brushless DC motor are usually bound by caulking. The stator cores constitute magnetic circuits and provide passages of magnetic fluxes; therefore, caulking positions must be selected so that they least affect magnetic paths.

Referring to the accompanying drawings, descriptions will now be given of a concentrated winding type brushless DC motor in accordance with the present invention in which caulking spots are disposed at positions that least affect magnetic paths of stator cores of the motor, and the stator cores are stacked and bound at the caulking spots.

FIG. 46 and FIG. 47 are state diagrams illustrating magnetic flux distributions in a stator and a rotor. Referring to FIG. 46, when magnets 1222 and 1222 of the rotor are located as shown in relation to a tooth 1212 of a stator core, the intensity of magnetism is weak at the tooth 1212 because it is positioned between the magnets. When attention is paid to a magnetic path in this case, a spot indicated by reference numeral 1214 exerts less influences on a passage of magnetic fluxes.

When the magnet 1222 of the rotor is located as shown in FIG. 47 with respect to the tooth 1212 of the stator core, the magnet fully faces the tooth 1212, so that the intensity of magnetism is the highest. When attention is paid to the magnetic path, the spot indicated by reference numeral 1214 is completely irrelevant to and therefore exerts no influences on the passage of magnetic fluxes.

Accordingly, the position 1214 can be said to be best suited for providing a caulking spot with minimized influences on the magnetic paths. Hence, by taking advantage of this, the caulking spot is positioned, and stator cores are stacked and caulked.

FIG. 45 is a top plan view of a stator core 1211. The stator tooth 1212 has a predetermined tooth width 1200X, and tooth distal end portions 1213 are formed on both sides of the tooth 1212 on a tooth portion on an inner diameter side, excluding the tooth body, and extended as far as apertures. A drive coil (not shown) is directly wound around the tooth 1212 by making use of spaces of slots 1203 so as to form a magnetic pole of the stator 1201 by the so-called concentrated series winding method.

A caulking spot 1204 where stacked stator cores are bound is located in a range of an extension in an outer diameter direction of a width 1200X of the tooth 1212 of a stator core 1211, corresponding to the position 1214 shown in FIG. 46 and FIG. 47. A width 1200Y of the caulking spot 1204 is set within the range of the width 1200X of the tooth 1212.

At the position of the caulking spot 1204, the stator cores are stacked and bound to form the stator cores of the concentrated winding type brushless DC motor. It is not necessary to provide the caulking spot 1204 on every tooth; the caulking spots 1204 may be provided on an arbitrary number of stator teeth 1212.

Thus, according to the present invention, a stator of a brushless DC motor can be made smaller, and stator cores can be stacked and bound without affecting a magnetic circuit by disposing a caulking spot within a range of an extension of a stator core tooth width X, in an outer diameter direction, of a concentrated winding type motor, thus permitting higher reliability of the motor to be attained.

What is claimed is:

1. A stator for a concentrated winding type brushless DC motor comprising:
    a stack of flat plate laminations of a ferro-magnetic material having an outer ring from which a plurality of spaced teeth extend inwardly and which have a slot between two adjacent teeth, said stack of flat plate laminations forming each said tooth having axially spaced apart upper and lower outer surfaces and side edges;
    a drive coil wound around each tooth to extend into the slot on each side of said tooth with only an air space as the electrical insulation between each of said upper and lower outer surfaces and said drive coil.

2. The stator as claimed in claim 1 wherein each said air space is of a distance that is sufficiently large to provide electrical insulation between said drive coil and said tooth upper and lower outer surfaces.

3. The stator as claimed in claim 1 further comprising electrical insulation material on said side edges of said stack of laminations of each said tooth over which said coil is wound.

4. The stator as claimed in claim 1 wherein at least one of the forward end of each of said upper and lower surfaces of said stack of laminations forming a tooth and the end extending from said ring is flat to permit a spacer over which said coil is wound to be removed to form said air space.

* * * * *